United States Patent
Mohamed et al.

(10) Patent No.: US 11,156,095 B2
(45) Date of Patent: Oct. 26, 2021

(54) TURBOCHARGER TURBINE WHEEL

(71) Applicant: Garrett Transportation I Inc., Torrance, CA (US)

(72) Inventors: Ashraf Mohamed, Harbor City, CA (US); Wagner Magalhaes, Torrance, CA (US)

(73) Assignee: Garrett Transportation I Inc., Torrance, CA (US)

( * ) Notice: Subject to any disclaimer, the term of this patent is extended or adjusted under 35 U.S.C. 154(b) by 32 days.

(21) Appl. No.: 16/525,353

(22) Filed: Jul. 29, 2019

(65) Prior Publication Data

US 2021/0032993 A1    Feb. 4, 2021

(51) Int. Cl.
| | |
|---|---|
| *F01D 5/14* | (2006.01) |
| *F02B 37/00* | (2006.01) |
| *F02C 6/12* | (2006.01) |
| *F04D 17/02* | (2006.01) |
| *F04D 29/24* | (2006.01) |

(52) U.S. Cl.
CPC .............. *F01D 5/141* (2013.01); *F02B 37/00* (2013.01); *F02C 6/12* (2013.01); *F04D 17/025* (2013.01); *F04D 29/24* (2013.01)

(58) Field of Classification Search
None
See application file for complete search history.

(56) References Cited

U.S. PATENT DOCUMENTS

| | | | |
|---|---|---|---|
| 8,360,730 B2 * | 1/2013 | Chen | F01D 5/141 416/188 |
| 8,807,926 B2 * | 8/2014 | Nagao | F02C 6/12 415/158 |
| 9,708,913 B2 * | 7/2017 | Martinez-Botas Mateo | F01D 5/143 |
| 9,777,578 B2 * | 10/2017 | Yokoyama | F01D 1/22 |

(Continued)

FOREIGN PATENT DOCUMENTS

| | | |
|---|---|---|
| CN | 102 080 575 A | 6/2011 |
| JP | 2012 177355 A | 9/2012 |

(Continued)

OTHER PUBLICATIONS

EPO Application No. 20 17 9166.2-1004, European Search Report, dated Dec. 2, 2020 (7 pages).

*Primary Examiner* — Michael Lebentritt
*Assistant Examiner* — Jason G Davis
(74) *Attorney, Agent, or Firm* — Brian J. Pangrle

(57) ABSTRACT

A turbocharger turbine wheel includes a hub; and blades that extend outwardly from the hub, where each of the blades includes a shroud edge, a leading edge, a trailing edge, a pressure side, and a suction side, where the shroud edge includes a minimum axial coordinate position where the shroud edge meets the leading edge, and a maximum axial coordinate position where the shroud edge meets the trailing edge, and where, between the minimum axial coordinate position and the maximum axial coordinate position, each of the blades includes a first lean angle at a first axial coordinate position defined with respect to a first radial line, a (Continued)

second lean angle at a second axial coordinate position defined with respect to a second radial line, and a lean angle inflection region at an inflection axial coordinate position that is between the first axial coordinate position and the second axial coordinate position.

15 Claims, 18 Drawing Sheets

(56) References Cited

U.S. PATENT DOCUMENTS

| | | | |
|---|---|---|---|
| 10,443,387 B2 * | 10/2019 | Mohamed | F01D 5/04 |
| 2016/0238019 A1 | 8/2016 | Kobayashi et al. | |
| 2019/0345825 A1 * | 11/2019 | Keating | F01D 5/048 |

FOREIGN PATENT DOCUMENTS

| | | | |
|---|---|---|---|
| WO | 2017 189291 A1 | 11/2017 | |
| WO | 2018 055375 A1 | 3/2018 | |

* cited by examiner

TURBOCHARGER TURBINE WHEEL

TECHNICAL FIELD

Subject matter disclosed herein relates generally to turbocharger turbine wheels for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. As an example, a shaft that is attached to one or more bladed wheels may be supported by one or more bearings disposed in a bearing housing, which may form a center housing rotating assembly (CHRA). During operation of a turbocharger, depending on factors such as size of various components, a SWA may be expected to rotate at speeds in excess of 200,000 rpm.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
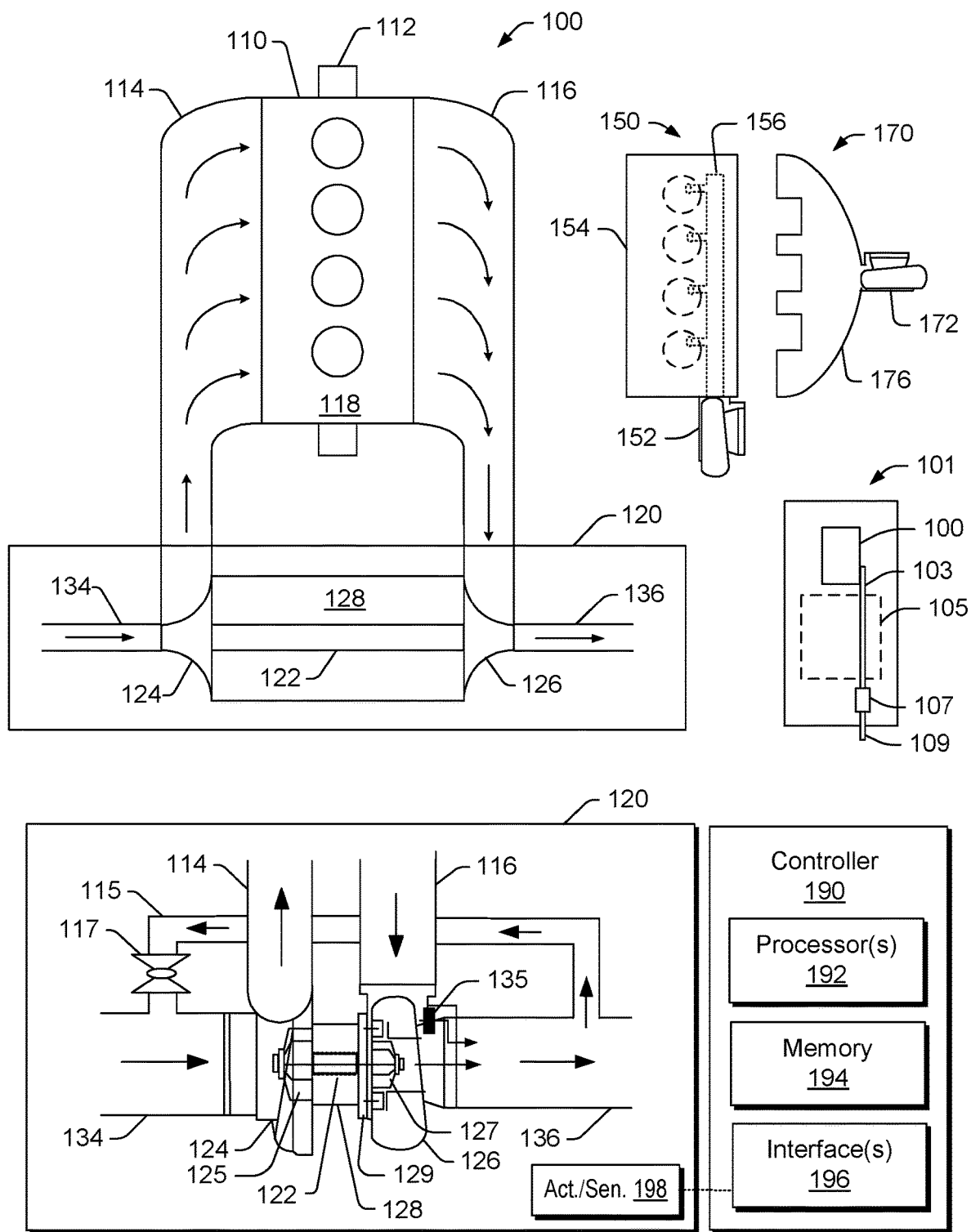
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 fora turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
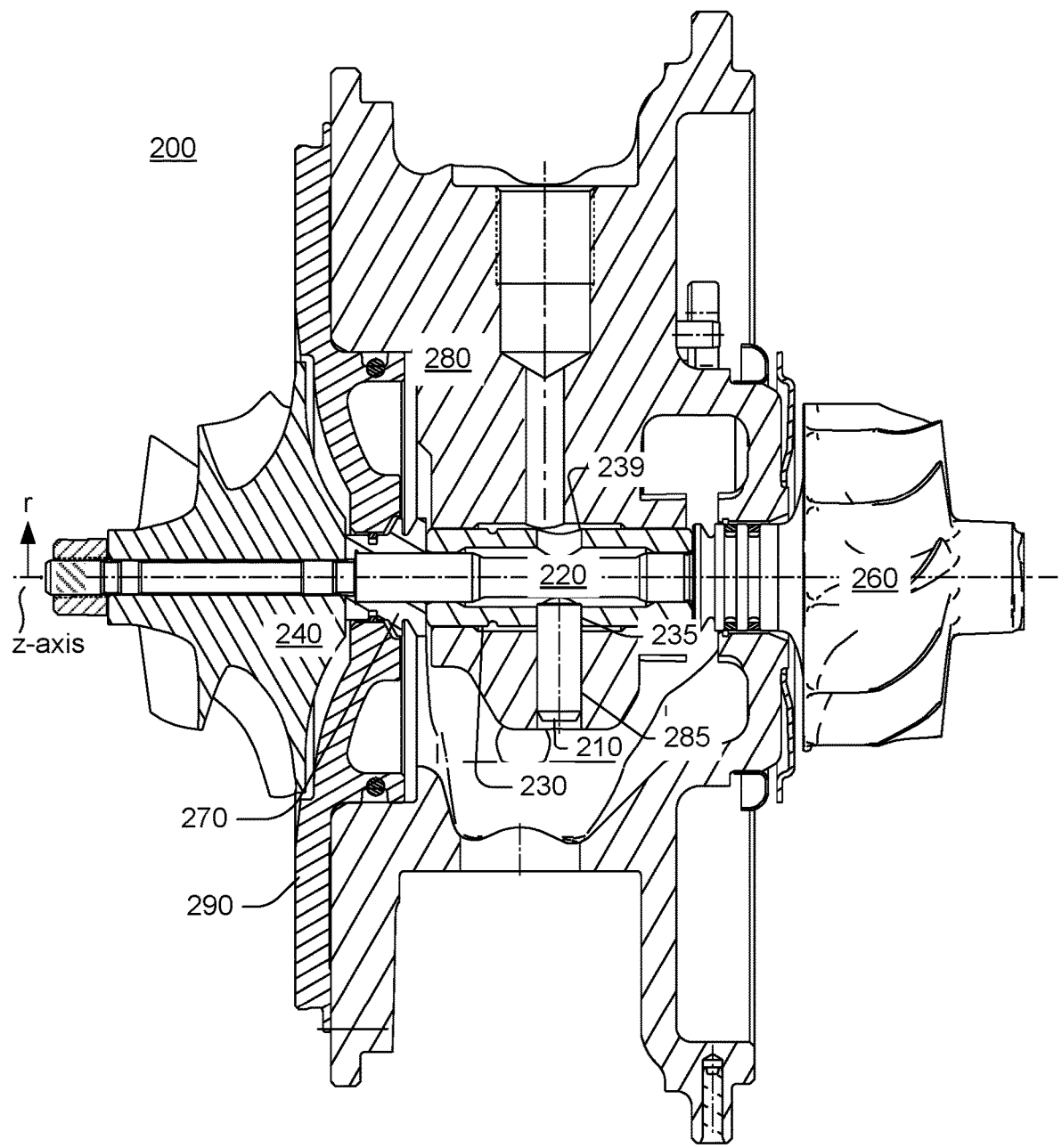
FIG. 2 is a cross-sectional view of an example of a turbocharger assembly and an end view and a cross-section view of an example of a journal bearing.

FIG. 2 shows an example of a turbocharger assembly 200 that includes a shaft 220 supported by a journal bearing 230 disposed in a center housing 280 between a compressor wheel 240 and a turbine wheel 260; noting that a thrust spacer 270 is shown as being positioned between the compressor wheel 240 and a shoulder of the shaft 220 with respect to a bore of a backplate 290. As shown in FIG. 2, the shoulder is formed by a step in diameter of the shaft 220 from a smaller diameter to a larger diameter, forming an annular axial face (e.g., a compressor side face). In the example of FIG. 2, the thrust spacer 270 abuts the axial face of the shaft 220 on one side and abuts an annular axial face of the compressor wheel 240 on an opposing side. The journal bearing 230 is located at least partially in a through bore of the center housing 280 via a locating pin 210. The locating pin 210 may be secured by being screwed into a socket 285 of the housing 280 and may be received by an aperture 235 of the journal bearing 230 to thereby locate the journal bearing 230 in the through bore of the center housing 280. As an example, the locating pin 210 may axially and azimuthally locate the journal bearing 230 in the through bore of the center housing 280.

As an example, the journal bearing 230 may move radially within the through bore of the center housing 280, for example, the journal bearing 230 may move up and down radially with respect to an axis of the locating pin 210 while being limited axially and azimuthally by the locating pin 210 (e.g., the journal bearing 230 may be a semi-floating journal bearing).

The turbocharger assembly 200 of FIG. 2 can be oil cooled as well as air cooled, for example, by being in an environment with ambient air or vehicle engine compartment air. A turbocharger may be cooled via one or more mechanisms. For example, a turbocharger may be cooled via air, water, oil or other fluid. As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system.

To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled; consider, as an example, a diesel engine with exhaust that may be at about 860 degrees C. and consider, as an example, a gasoline engine with exhaust that may be at about 1050 degrees C. Thus, a turbocharger that is in fluid communication with exhaust of a gasoline fueled internal combustion engine can experience higher temperatures when compared to a diesel fueled internal combustion engine. Further, consider the example arrangements 150 and 170 of FIG. 1 where the turbine housing assemblies 152 and 172 are in close proximity to combustion cylinders, which may result in the turbine housing assemblies 152 and 172 experiencing higher exhaust temperatures and/or higher ambient temperatures.

Figure 3:
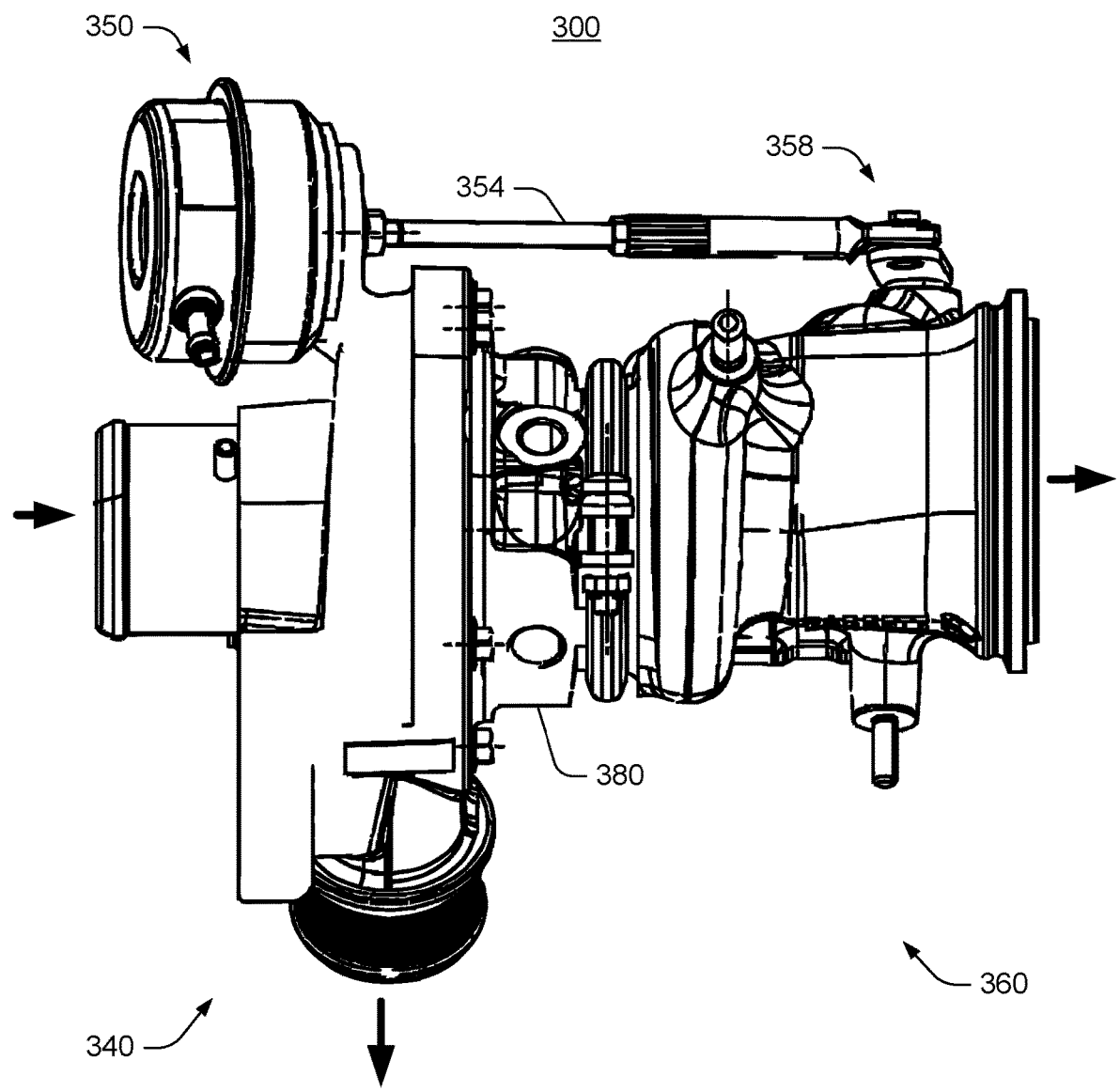
FIG. 3 is a side view of an example of a turbocharger.

FIG. 3 shows an example of a turbocharger 300 that includes a compressor assembly 340 with a compressor housing for a compressor wheel, a turbine assembly 360 with a turbine housing for a turbine wheel, a center housing 380 for a bearing, bearings or a bearing assembly to rotatably support a shaft of a shaft and wheel assembly (SWA), and an actuator 350 with a linkage 354 to a control arm assembly 358 for a wastegate of the turbine assembly 360. The turbocharger 300 can include one or more of the components shown in FIG. 2. In the view of FIG. 2, the exhaust inlet of the turbine assembly 360 is not visible because it is on the opposite side. General directions of flow of air or exhaust are indicated by arrows. The actuator 350 is shown as being mounted to the compressor assembly 340, which can help to reduce temperatures experienced by the actuator 350 (e.g., compared to having the actuator mounted on a turbine housing). The turbocharger 300 can be part of a vehicle such as, for example, the vehicle 101 of FIG. 1. As an example, the turbine assembly 360 may optionally be arranged such as in one of the example arrangements 150 or 170 of FIG. 1.

Figure 4:
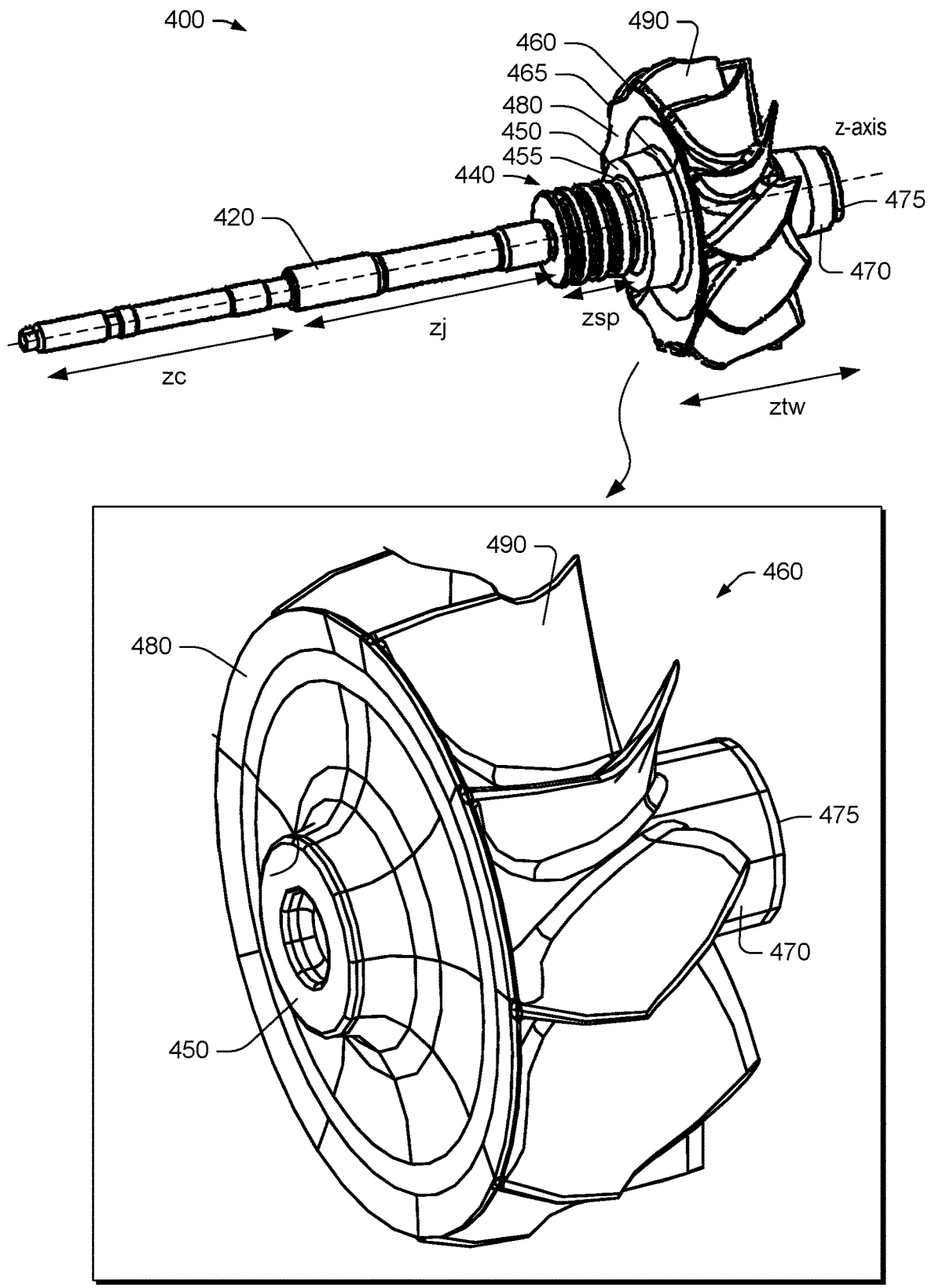
FIG. 4 is a perspective view and an enlarged view of an example of a shaft and wheel assembly (SWA)

FIG. 4 shows a perspective view of a shaft and wheel assembly (SWA) 400. As shown, the SWA 400 includes a shaft 420, a seal portion 440 and a turbine wheel 460 where the turbine wheel 460 includes a nose 470, a backdisk 480 and blades 490. The turbine wheel 460 can be a single, unitary piece of material and referred to as a single component or a single piece. A portion of the turbine wheel 460 can be referred to as a hub 465. For example, the backdisk 480 can be a part of the hub 465 from which the blades 490 extend. The hub 465 can include the backdisk 480 and the nose 470 and extend the length of the turbine wheel as indicated by an axial length ztw as measured along a rotational z-axis of the SWA 400.

As an example, the seal portion 440 can be formed in part by the turbine wheel 460 and in part by the shaft 420, can be formed by the shaft 420 or can be formed by the turbine wheel 460. As an example, the seal portion 440 can be formed at least in part by the shaft 420. The seal portion 440 can be defined by an outer radius.

As shown in FIG. 4, the SWA 400 can include a shoulder or step down from the turbine wheel 460 toward the shaft 420. For example, a shoulder can step down from an outer surface of the shaft joint portion 450 to an outer surface 455, which may be at a radius equal to or approximately equal to that of the seal portion 440. The shaft joint portion 450 can include a surface that is an annular axial face that can form a portion of a shoulder.

As an example, the shaft joint portion 450 can include a shaft joint surface that can be defined in part by a shaft joint radius. For example, consider a shaft joint surface that can be utilized to join a shaft to a turbine wheel (e.g., via welding, etc.). In such an example, the shaft joint surface of the turbine wheel can be a mating surface that mates with a turbine wheel joint surface of a shaft where the two surfaces can be brought into proximity or direct contact and joined (e.g., via welding). As an example, a shaft joint surface may be an annular surface that can be welded to a surface of a shaft to form a SWA (e.g., to form a weld or welds).

The SWA 400 can include dimensions such as, for example, axial dimensions for a compressor wheel portion zc, which may include one or more pilot surfaces, a set of threads, etc., and a bearing portion zj, which may include one or more journal surfaces (e.g., a compressor side journal surface and a turbine side journal surface, etc.).

As shown in FIG. 4, the seal portion 440 can include one or more annular grooves that may be configured to receive one or more seal elements (e.g., one or more seal rings). As shown, the seal portion 440 can be defined in part by an axial dimension zsp. As an example, a seal element can be a split ring such as, for example, a piston ring. As mentioned, a SWA may be formed by welding a shaft to a turbine wheel such that the resulting SWA has a shaft and a turbine wheel arranged and fixed along a common rotational axis.

FIG. 4 shows an enlarged perspective view of a portion of the SWA 400, specifically the turbine wheel 460. As an example, a turbine wheel may be defined using diameters, which can be circles that inscribe features of the turbine wheel. For example, where a turbine wheel includes an odd number of blades, a diameter as a line may not be drawn from a leading edge of one blade to a leading edge of another blade. In such an example, diameter can be defined via a circle that inscribes the leading edges of the blades or, for example, mathematically, as twice a radius. A turbine wheel may be defined by an inducer diameter (e.g., associated with exhaust inflow) and an exducer diameter (e.g., associated with exhaust outflow). As an example, an inducer diameter can exceed an exducer diameter. As an example, a trim of a turbine wheel can be defined using its inducer diameter and its exducer diameter. Where diameter is mentioned, it may refer to a diameter of a circle that can be drawn with respect to features of a turbine wheel. As an example, a turbine wheel may be defined in a cylindrical coordinate system that includes axial, radial and azimuthal coordinates (e.g., r, z, and $\Theta$).

As an example, a balancing process may alter one or more dimensions of a turbine wheel, for example, via removal of material. For example, consider removal of material from the nose 470 of the turbine wheel 460 of the SWA 400. As shown, the nose 470 has an outer diameter that is less than an outer diameter of the backdisk 480. Another option can be to remove material from the backdisk 480. As an example, material may be removed from the shaft joint portion 450. In such an example, material removal may have minimal impact on the backdisk 480 as to its ability to support the blades 490.

As shown in the example of FIG. 4, an exhaust turbocharger turbine wheel 460 can include the hub 465 that includes the nose 470, the backdisk 480, a shaft joint portion 450 (e.g., as part of the backdisk 480) and a rotational axis (z-axis); the blades 490 that extend from the hub 465 to define exhaust flow channels where each of the blades 490 includes a leading edge, a trailing edge, a hub profile, a shroud profile, a pressure side, and a suction side; where the backdisk 480 includes an outer perimeter radius measured from the rotational axis of the hub 465 and an intermediate radius at an outer perimeter of the shaft joint portion 450 measured from the rotational axis of the hub 465.

As to the shaft joint portion 450, it is shown as being substantially cylindrical. As an example, the backdisk 480 can be defined as a lower portion of the hub 465 that includes at least part of the shaft joint portion 450 and that extends outwardly to a maximum outer perimeter of the backdisk 480.

As explained, the shaft joint portion 450 can join the seal portion 440, which may be an integral part of the shaft 420. As an example, the seal portion 440 can be welded to the shaft joint portion 450 to form a welded joint that is to permanently join the shaft 420 and the turbine wheel 460 to form the shaft and wheel assembly (SWA) 400.

With reference to FIG. 2, a seal portion is shown as being part of the shaft 220 and as being joined to the turbine wheel 260 to form a SWA. The seal portion can include one or more annular grooves as shown in FIG. 2 where one or more corresponding seal elements (e.g., seal rings) can be disposed at least in part therein to form a seal or seals between a lubricant region of the center housing 280 and an exhaust region in which the turbine wheel 260 is disposed. As shown, the center housing 280 includes a turbine side bore in which the seal portion and the seals are seated. The bore includes a bore wall where the seals may contact the bore wall (e.g., consider piston rings as split rings that can be compressed during installation and then expand once installed to form seals).

As an example, a shaft may be made of a material that is the same as that of a turbine wheel or that is different from that of a turbine wheel. Where materials differ, the materials can generally be amenable to welding such that a SWA can be formed. As mentioned, a compressor wheel may be manufactured from a material that has a lesser specific gravity than a material of a turbine wheel. In general, a compressor wheel experiences operational temperatures that are less than those of a turbine wheel. As an example, a turbine wheel can be made of a nickel alloy. For example, consider a NiCrFe-based alloy (e.g., HASTALLOY™ material, INCONEL™ material, etc.) or another alloy. In contrast, a compressor wheel may be made of a lighter material such as, for example, aluminum or an aluminum alloy. A turbine wheel material may have a specific gravity that is double or more than double that of aluminum (approximately 2.7 versus approximately 8.4 for INCONEL™ 625 material).

In FIG. 2, a rotating assembly can include the shaft 220 and the turbine wheel 260 as an SWA along with the compressor wheel 240 and a nut (e.g., for a compressor wheel with a through bore). As an example, a so-called boreless compressor wheel may be utilized where the compressor wheel can join to a shaft without use of an end nut.

A rotating assembly can have a mass defined by a sum of individual masses of components that make up the rotating assembly. As mentioned, flow of exhaust to an exhaust turbine disposed in a turbine housing can be a driver for rotation of a rotating assembly where mass and other factors can determine how much exhaust must flow before rotation commences.

Figure 5:
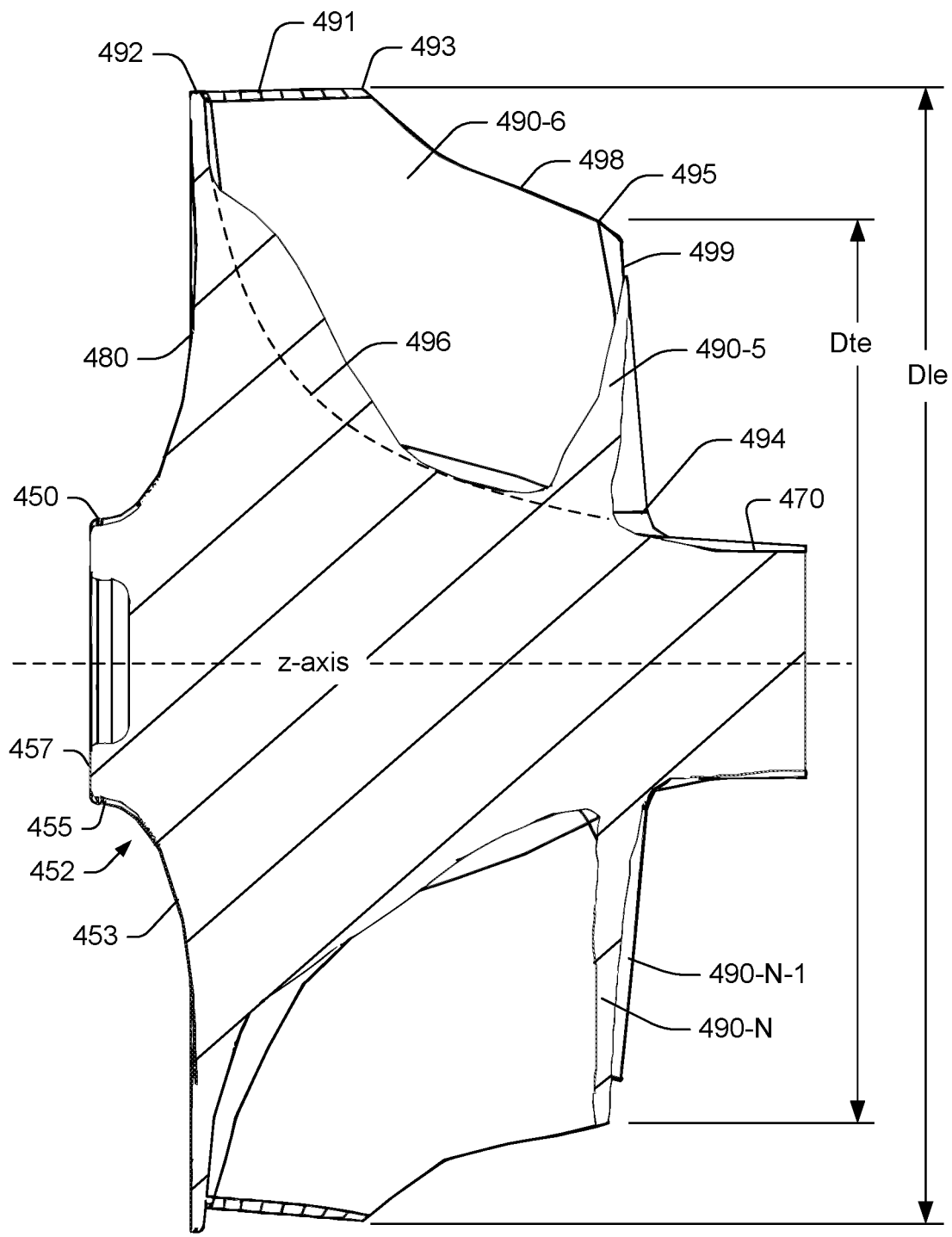
FIG. 5 is a cross-sectional, cutaway view of an example of a turbine wheel.

FIG. 5 shows the example turbine wheel 460 in a cross-sectional, cutaway view. FIG. 5 shows the shaft joint portion 450 with a shoulder 452 and surfaces 453, 455 and 457. As shown, the surface 457 can be a surface that is a mating surface for joining a shaft to the shaft joint portion 450 of the turbine wheel 460. As mentioned, the outer diameter of the shaft joint portion 450 at the surface 455 may be approximately the same as that of a seal portion (see, e.g., the seal portion 440).

As shown in the example of FIG. 5, the turbine wheel 460 includes various blade features such as a leading edge 491 (or inducer edge), a trailing edge 499 (or an exducer edge), a backdisk point 492 of the leading edge 491, a tip point 493 of the leading edge 491, a hub point 494 of the trailing edge 499 and a tip point 495 of the trailing edge 499. As shown, the turbine wheel 460 has a blade outer diameter at the tip point 493 of the leading edge 491 (e.g., inducer edge); another blade outer diameter at the tip point 495 of the trailing edge 499 (e.g., exducer edge); and a blade diameter at the hub point 494 at the trailing edge 499 (e.g., exducer edge).

As mentioned, a circle may inscribe blade features to define a diameter. In FIG. 5, the diameters Dle (diameter leading edge) and Dte (diameter trailing edge) are not shown as corresponding to circles but rather as corresponding to the particular cross-section, where a circle would have a slightly larger diameter than Dle and another circle would have a slightly larger diameter than Dte.

As shown in the example of FIG. 5, a dashed line represents a hub profile 496 of the blade 490-5 while a solid line 498 represents at least a portion of a shroud profile of the blade 490-5.

Figure 6:
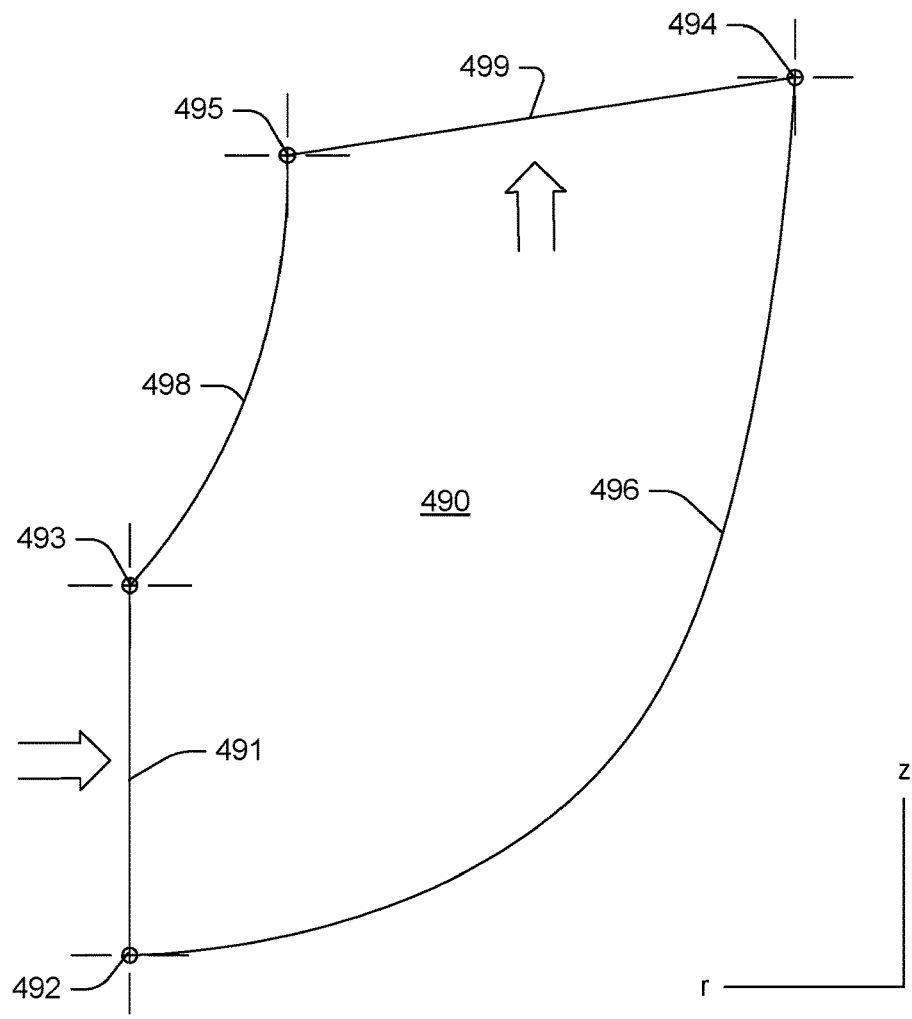
FIG. 6 is a projected view of an example of a blade of a turbine wheel with a radial inflow leading edge and a projected view of an example of a blade of a turbine wheel with a mixed-flow inflow leading edge.
Figure 6:
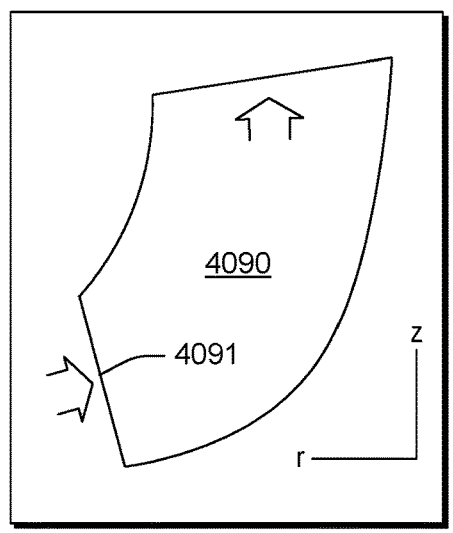

FIG. 6 shows a plan view of an example of the blade 490, along with various points and profiles described with respect to FIG. 5. FIG. 6 also shows arrows that indicate intended direction of flow of exhaust, from the leading edge 491 to the trailing edge 499 where two adjacent blades define a flow channel for exhaust (e.g., an exhaust flow channel). As mentioned, one side of a blade can be defined as a pressure side while an opposing side of the blade can be defined as a suction side. The plan view of FIG. 6 is a projected view such that the concave and convex shapes of the blade 490 are not seen. In FIG. 6, the blade 490 can be defined with respect to radial and axial coordinates. As an example, a polar angle plot may be utilized to provide for additional information that defines the blade 490. For example, consider a plot of wrap angle along a camber line. As an example, the blade 490 may be defined using one or more equations, parameters, etc., of an airfoil or an impeller.

As an example, a turbine wheel can be a radial flow turbine wheel (e.g., radial inlet flow) or can be a mixed-flow turbine wheel (e.g., mixed inlet flow) where an angle can define at least a portion of a leading edge such that incoming exhaust has both a radial component and an axial component. FIG. 6 shows an example of a mixed-flow turbine wheel blade 4090 where a leading edge 4091 is at an angle other than 90 degrees with respect to the r-axis and is at an angle other than 0 degrees with respect to the z-axis (e.g., approximately 1 degree to approximately 89 degrees). As an example, a turbine wheel blade may be radially stacked or not radially stacked (e.g., non-radially stacked).

Figure 7:
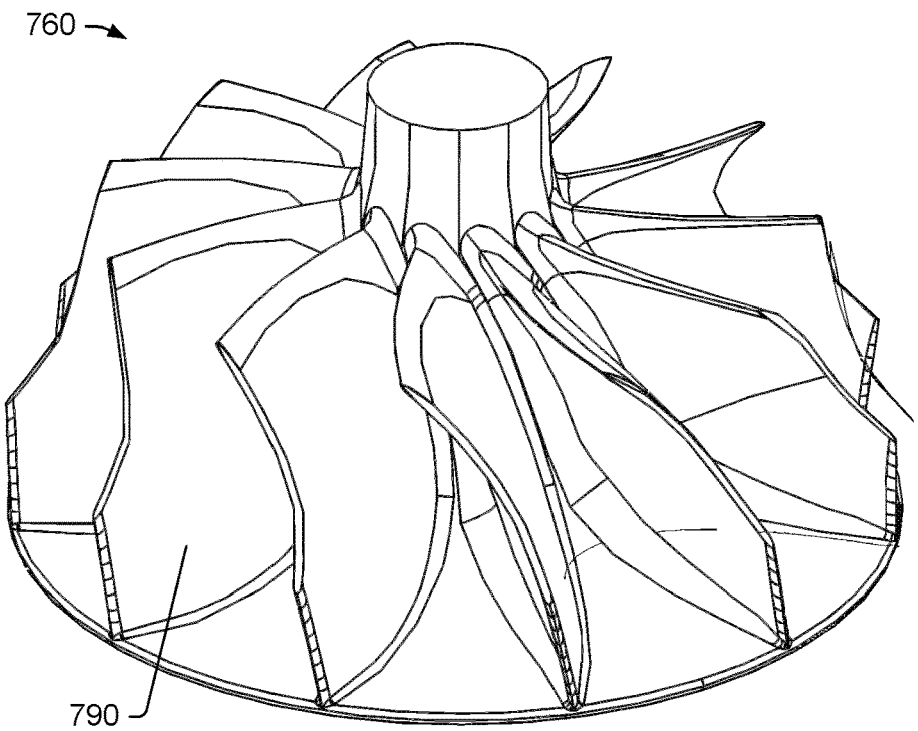
FIG. 7 is a series of perspective views of an example of a turbine wheel.
Figure 7:
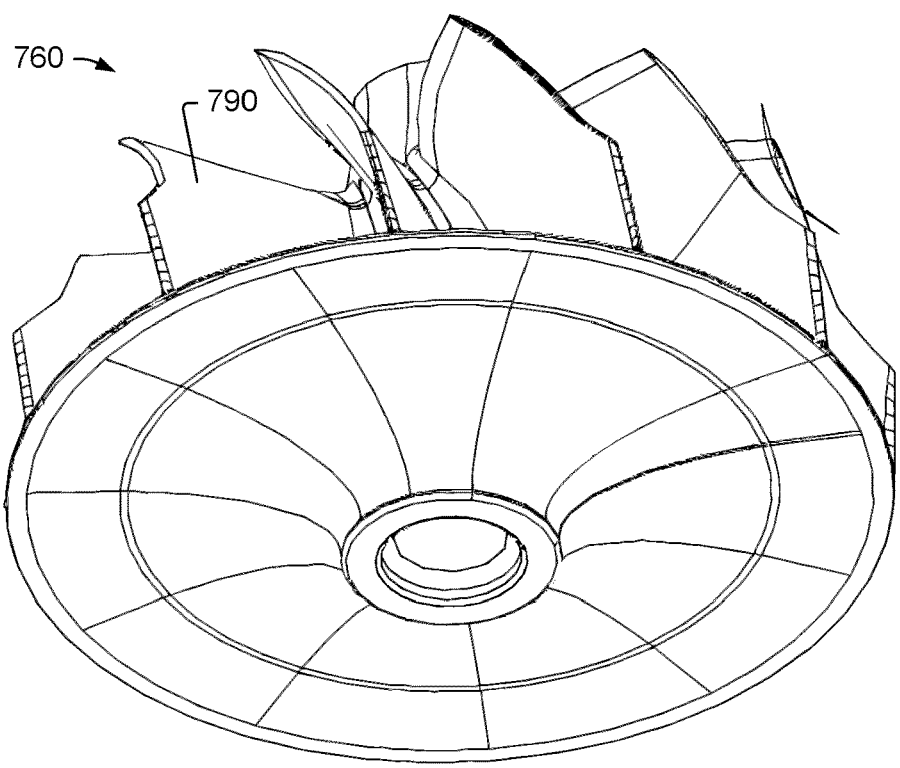

FIG. 7 shows two perspective views of an example of a turbine wheel 760 where the example turbine wheel 760 includes eleven blades, one of which is labeled as a blade 790; noting that a turbine wheel may include a number of blades, for example, in a range from approximately 5 blades to approximately 30 blades. In the example of FIG. 7, the turbine wheel 760 may be a radial flow turbine wheel.

Figure 8:
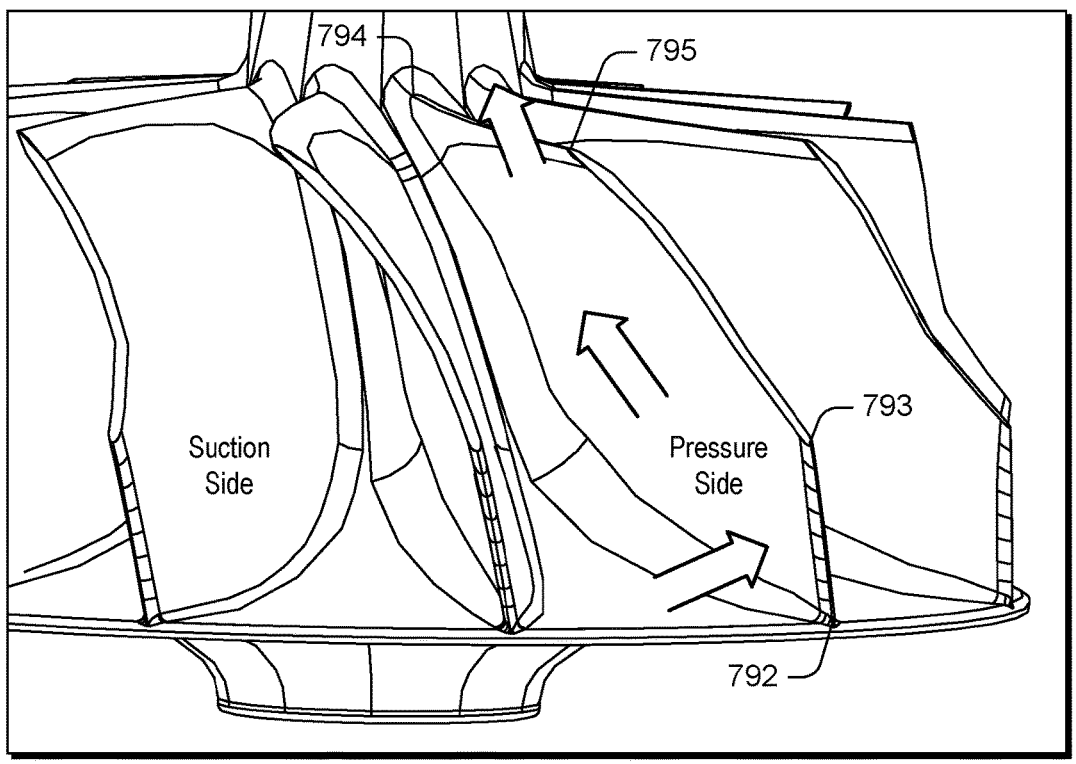
FIG. 8 is a series of views of blades of the turbine wheel of FIG. 7.
Figure 8:
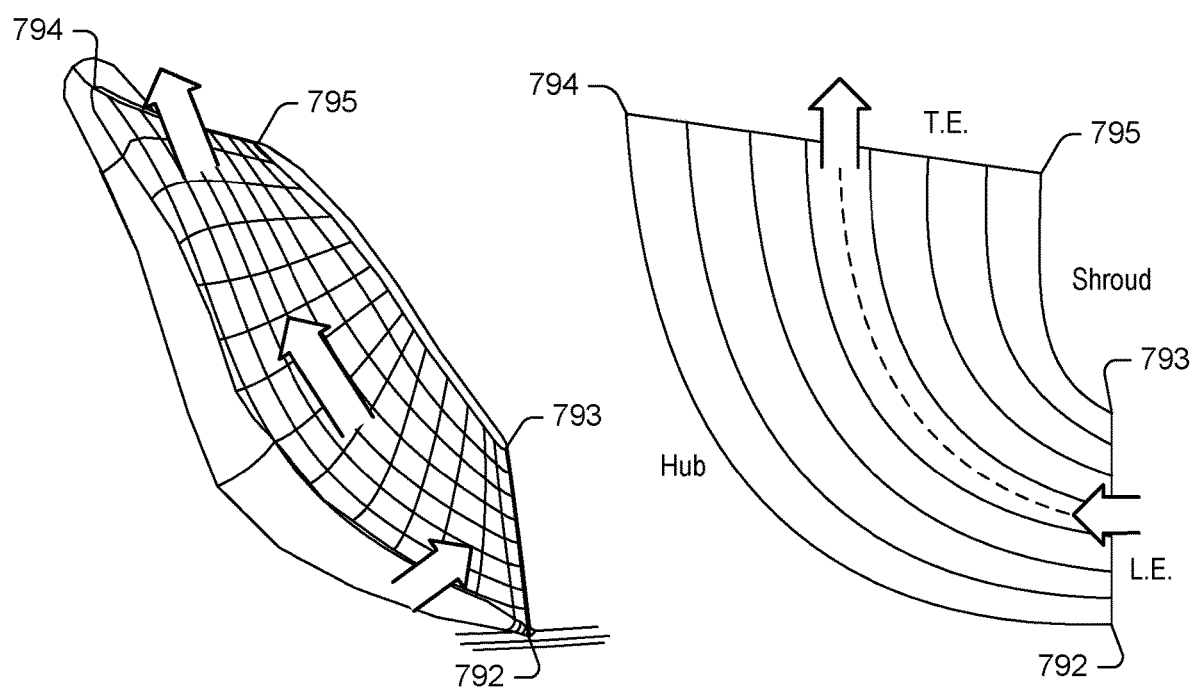

FIG. 8 shows an enlarged side view of the turbine wheel 760 along with a meshed view of one blade such as the blade 790 and a projected view of one blade such as the blade 790, along with general directions of gas flow. In the projected view (lower right), the dashed line represents a meridional line that extends from the leading edge (L.E.) to the trailing edge (T.E.) between the hub profile and the shroud profile. As an example, one or more features of a blade may be described with respect to a meridional line, a meridional coordinate, etc. For example, consider a normalized meridional coordinate system that is zero at the leading edge and unity (one) at the trailing edge. In FIG. 8, the various points 792, 793, 794 and 795 may be understood with reference to the points 492, 493, 494 and 495 of FIGS. 5 and 6. Various other features described with respect to FIGS. 4, 5 and 6 may be utilized to describe various features of the turbine wheel 760 of FIG. 7.

Figure 9:
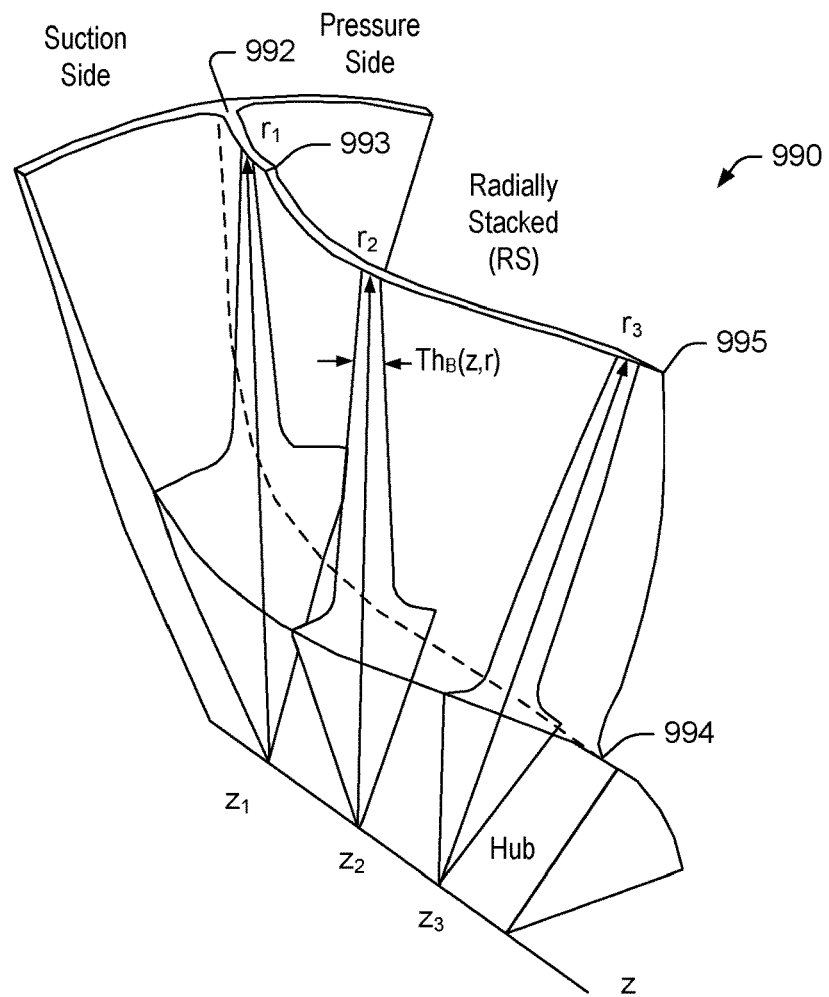
FIG. 9 is a series of views of portions of examples of turbine wheels.
Figure 9:
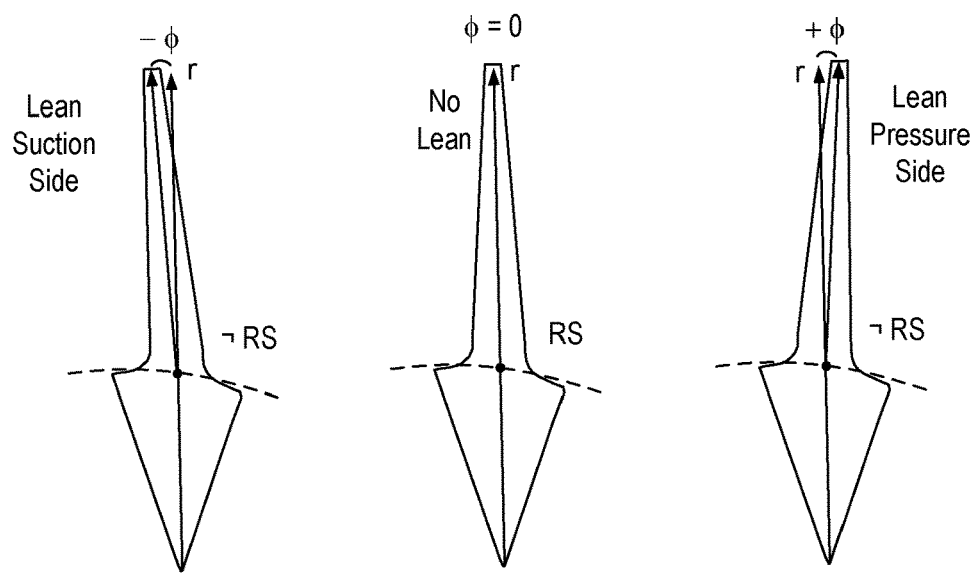

FIG. 9 shows an example of a blade 990 as a section of a turbine wheel that includes a plurality of blades. As shown, the blade 990 includes various points 992, 993, 994 and 995, which may be defined in a cylindrical coordinate system. In the example blade 990 of FIG. 9, three radial lines are shown, labeled $r_1$, $r_2$ and $r_3$, which have corresponding axial coordinates $z_1$, $z_2$ and $z_3$, where each of the three radial lines may be referred to as a radial fiber. In FIG. 9, at three different r, $\Theta$ planes at $z_1$, $z_2$ and $z_3$, cross-sectional areas and shapes of the hub and the blade 990 are illustrated. As an example, a blade can be defined in part by a thickness, which can be shown as the thickness $Th_B(z,r)$ at a particular axial dimension and a particular radial dimension. A blade thickness can be a distance that is between a pressure surface (e.g., a pressure side) and a suction surface (e.g., a suction side) of a blade. In the example of FIG. 9, the blade 990 can have a thickness that various in different regions. As an example, a blade may be thinner at a shroud edge (e.g., along a shroud profile) and thicker at a hub edge (e.g., along a hub profile). As shown in FIG. 9, the hub can vary in its radius where the hub can have a smaller radius near a nose and a larger radius near a base (e.g., where the blade 990 joins the backdisk).

As shown, the blade 990 is radially stacked (RS) because a radial line can be drawn from the hub to the leading edge at $z_1$, $r_1$, from the hub to the shroud edge at $z_2$, $r_2$, and from the hub to the shroud edge at $z_3$, $r_3$. In FIG. 9, the radial lines have their origin along the z-axis, which is the rotational axis of a turbine wheel that includes the blade 990. Radial stacking can be beneficial with respect to stresses of a turbine wheel as radial stacking helps to reduce excessive blade stresses at high rotational speeds (e.g., rotational speeds in excess of 10,000 rpm, 100,000 rpm, or more).

In FIG. 9, the radial lines of the blade 990 are also mean lines in that each of the radial lines is centered between the suction side and the pressure side of the blade 990. Another type of line that can be utilized to describe a blade is the camber line (or camberline), which is a mean line of a blade profile that extends from the leading edge to the trailing edge, halfway between the pressure side (pressure surface) and the suction side (suction surface). In the example blade 990 of FIG. 9, a camber line or camber lines can form a camber sheet or camber surface that extends from the leading edge to the trailing edge of the blade 990 where at each axial position, a radial line extends from the hub profile to the shroud profile of the camber surface. For example, the portions of the radial lines $r_1$, $r_2$ and $r_3$ between the hub profile and the leading edge, the shroud edge and the trailing edge are all in the camber surface for the blade 990. For a given blade, where a radial line at an axial position, between the hub profile and the leading edge, the shroud profile or the trailing edge, does not coincide with the camber surface, that blade is not radially stacked.

FIG. 9 also shows two examples of non-radially stacked (¬ RS) blades, which can be defined by a lean angle. As shown, a lean angle can be defined with respect to a radial line where the lean angle can be toward a suction side or toward a pressure side. As an example, a lean angle can be defined to be negative when it is toward a suction side and positive when it is toward a pressure side. As shown, for a radially stacked blade, the lean angle is zero. As an example, a blade may be non-radially stacked and include a lean angle that is in some regions negative and in some regions positive.

As an example, a blade may be defined by an average lean angle at a particular z-axis position. For example, where a blade is curved, the lean angle can vary with respect to radial position. In such an example, a lean angle may increase and/or decrease with respect to radial position. As an example, a blade may lean toward the pressure side and then lean toward the suction side within a region that extends inwardly from the outer edge of the blade. In such an example, the blade may have a positive lean angle over a radial length and then a negative lean angle over a radial length. As an example, a blade may lean and then return to a radial line. For example, consider a blade that leans toward the pressure side and then near the outer edge is along a radial line. In such an example, the blade may have positive lean angles with respect to radial position and a zero lean angle with respect to one or more radial positions. As to an average lean angle, in such an example, a series of angles may be utilized for corresponding radial positions where the average lean angle would be positive. As mentioned, a blade may be characterized by a lean angle, which may be negative, zero or positive, where the lean angle may be an average lean angle or, for example, a local lean angle at a radial position offset from a radial line.

Figure 10:
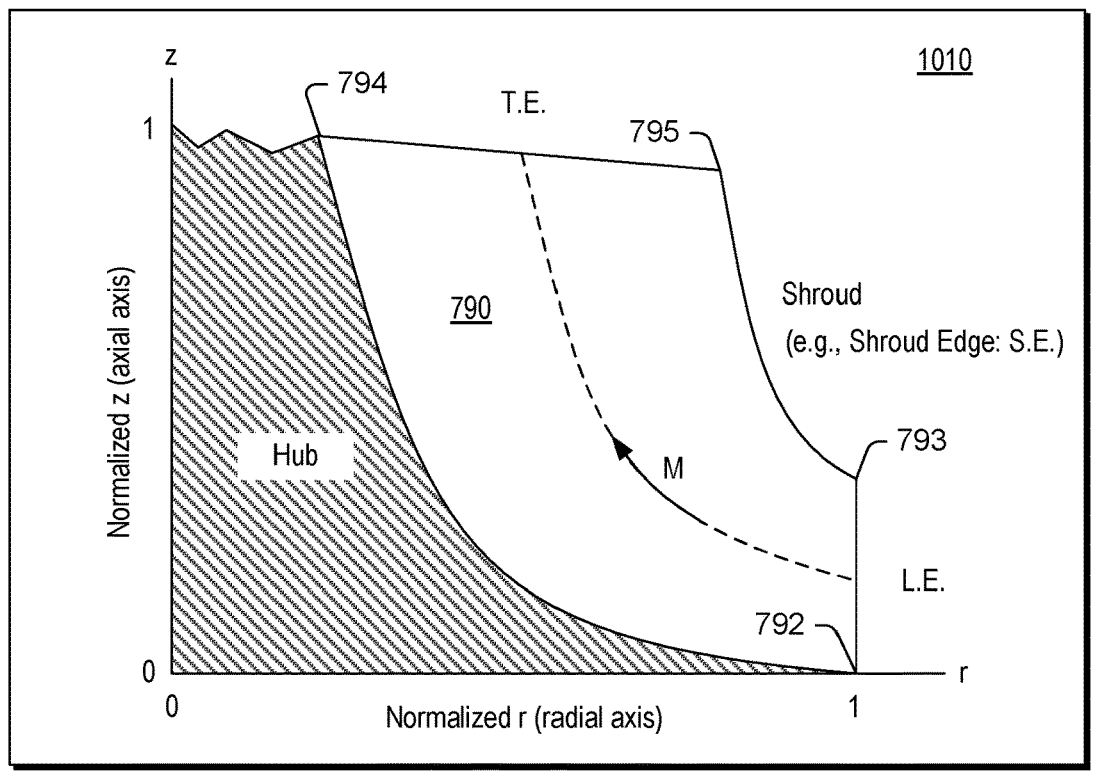
FIG. 10 is a series of plots of examples of turbine wheel blade characteristics.
Figure 10:
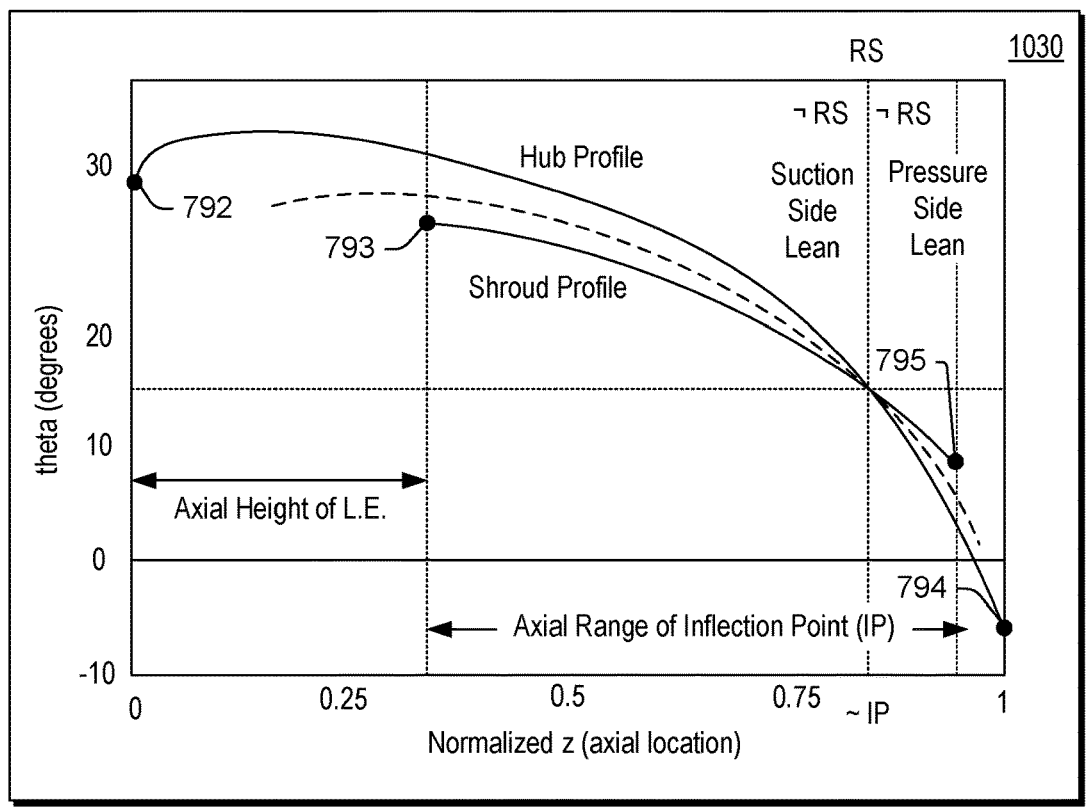

FIG. 10 shows a plot 1010 and a plot 1030 that correspond to the example blade 790. The plot 1010 shows a meridional line (M) along a normalized plane of the axial axis and the radial axis of a projection of the blade 790 where the hub profile and shroud profile are shown along with the leading edge (L.E.) and the trailing edge (T.E.). As shown, the shroud profile can be represented by a shroud edge (S.E.).

The plot 1030 shows the hub profile, the meridional line (e.g., meridional profile) and the shroud profile with respect to theta and normalized z axial axis coordinate positions. As shown in the plot 1030, the blade 790 includes a non-radially stacked portion that leans toward the suction side (S.S.) and a non-radially stacked portion that leans toward the pressure side (P.S.). The plot 1030 also shows an approximate inflection point (IP) where the blade 790 may include an approximately radially stacked region as a transition region where, moving along the z-axis, the blade 790 transitions from leaning in one direction to leaning in another, opposite direction (e.g., suction side lean to pressure side lean, negative lean angle to positive lean angle, etc.).

In the plot 1030, the axial height of the leading edge (L.E.) can be defined as well as an axial range for an inflection point or inflection region. For example, the blade 790 can include a transition point or transition region that is within an axial range from the point 793 where the leading edge meets the shroud edge to the point 795 where the shroud edge meets the trailing edge. As an example, an inflection can refer to a change in sign of a lean angle from being positive to negative or from being negative to positive. As an example, an inflection point may be a point where a lean angle is zero (e.g., not positive and not negative).

Figure 11:
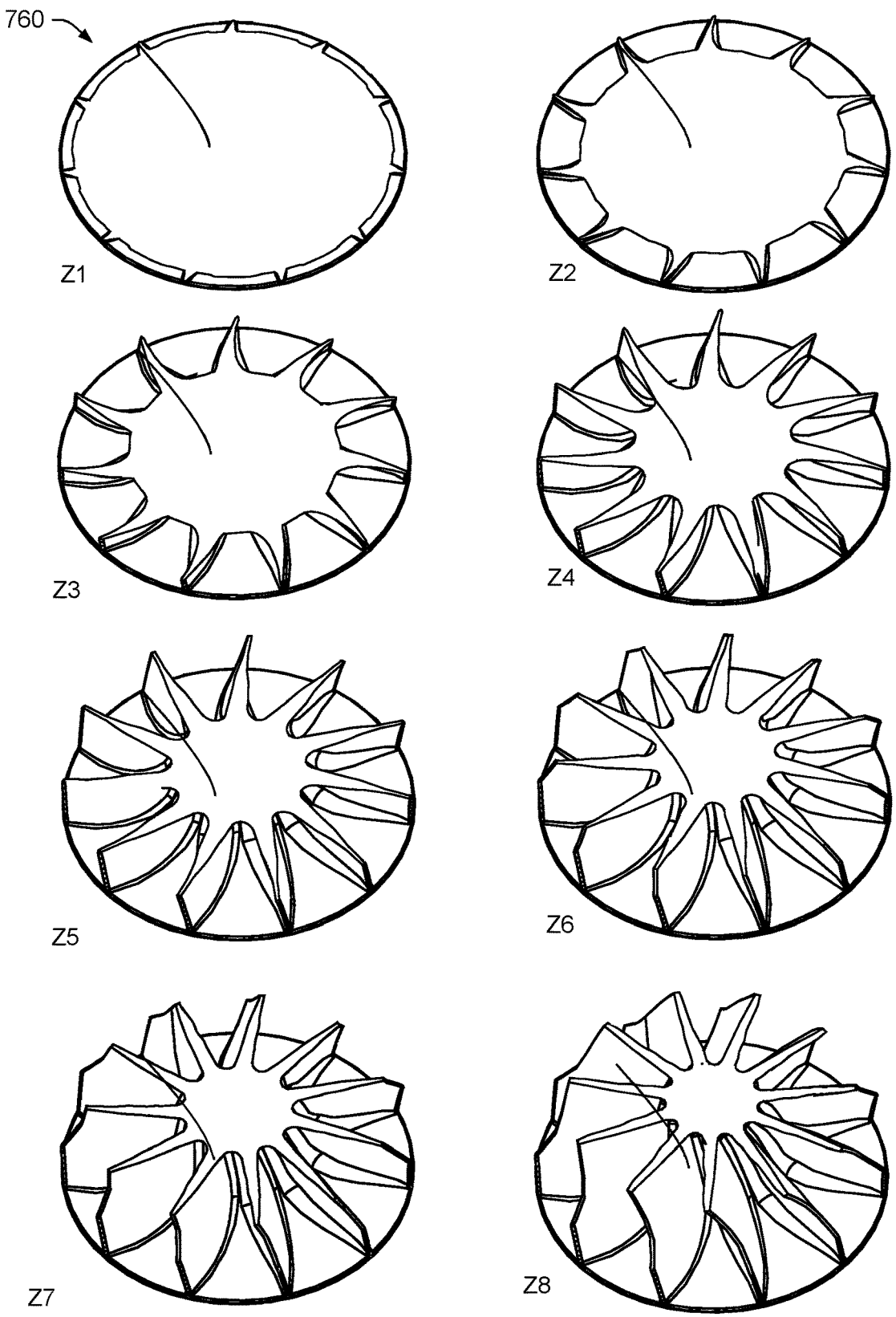
FIG. 11 is a series of perspective, cutaway views of the turbine wheel of FIG. 7.

FIG. 11 shows the turbine wheel 760 in a series of cross-sectional, cutaway views at different axial positions along a z-axis (Z1, Z2, Z3, Z4, Z5, Z6, Z7 and Z8), which is the rotational axis of the turbine wheel 760. In each of the views, a radial line can be drawn to determine whether a blade is radially stacked, not radially stacked, leaning or not leaning where leaning can be defined by one or more lean angles that include at least one non-zero lean angle at at least one radial position. As shown, the axial position Z1 is close to the backdisk while the axial position Z8 is close to the nose. In each of the cutaway views, blade thicknesses can be seen, which can vary with respect to axial and radial dimensions. In each of the cutaway views, a flat, planar surface is visible that is formed by a portion of the hub and a portion of the blades. As mentioned with respect to FIG. 9, the hub can be represented in part by a radius (e.g., or a diameter), where the radius can decrease in a direction from the backdisk to the nose (e.g., from Z1 to Z8). In the various cutaway views, the blades can appear to be increasing in length from the hub (e.g., as the hub radius becomes smaller); noting that a transition may occur at the end of the leading edge (e.g., tip of a leading edge), which meets the shroud edge. As an example, for a mixed-flow turbine wheel, a leading edge of a blade may extend beyond a backdisk such that at least a portion of a leading edge can have a radius that is greater than a backdisk radius. For example, consider the cutaway view at Z4 where, for a mixed-flow turbine wheel, the leading edge may extend to a radius that is greater than that of the backdisk.

Figure 12:
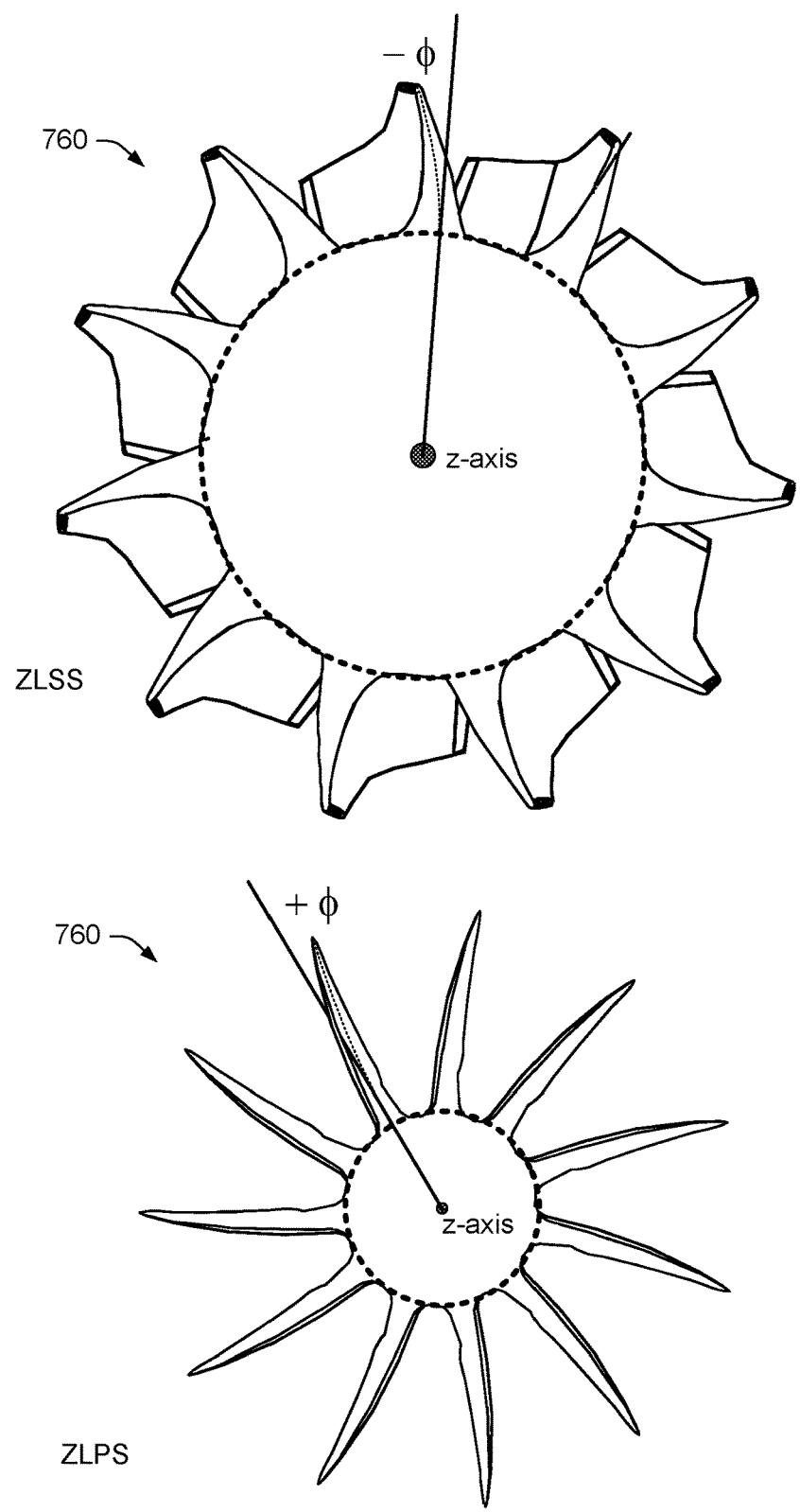
FIG. 12 is a series of plan, cutaway views of the turbine wheel of FIG. 7.

FIG. 12 shows two cross-sectional, cutaway views of the turbine wheel 760 looking from the backdisk side where, closer to the backdisk at a z-axis position of ZLSS, the blades have a negative lean angle and where, closer to the nose at a z-axis position of ZLPS, the blades have a positive lean angle. In such a turbine wheel, the blades transition from a negative lean to a positive lean in moving axially from the backdisk to the nose of the turbine wheel where the transition occurs in an axial range defined by the shroud profile (e.g., shroud edge, S.E.), which is delimited by the leading edge at a lower axial position (e.g., minimum axial position of the shroud profile) and the trailing edge at a higher axial position (e.g., maximum axial position of the shroud profile) (see also, e.g., the plot 1010 and the plot 1030 of FIG. 10, which show the leading edge and the shroud profile). In the example of FIG. 12, at the axial position ZLSS, the lean angle may be in a range of approximately minus 10 degrees to approximately minus 20 degrees and, at the axial position ZLPS, the lean angle may be in a range of approximately greater than 0 degrees to approximately plus 10 degrees. In such examples, the lean angle may be measured with respect to a point at a hub of a blade (e.g., a hub profile) and a point at a shroud edge of the blade where the point at the hub of the blade is along a radial line where the point at the shroud edge of the blade does not fall on the radial line (e.g., such that the lean angle is non-zero). As to the values of the axial positions ZLSS and ZLPS, these may be determined with reference to the views of FIG. 11, for example, by matching the shapes and/or dimensions (e.g., radii, etc.) of the blades.

Figure 13:
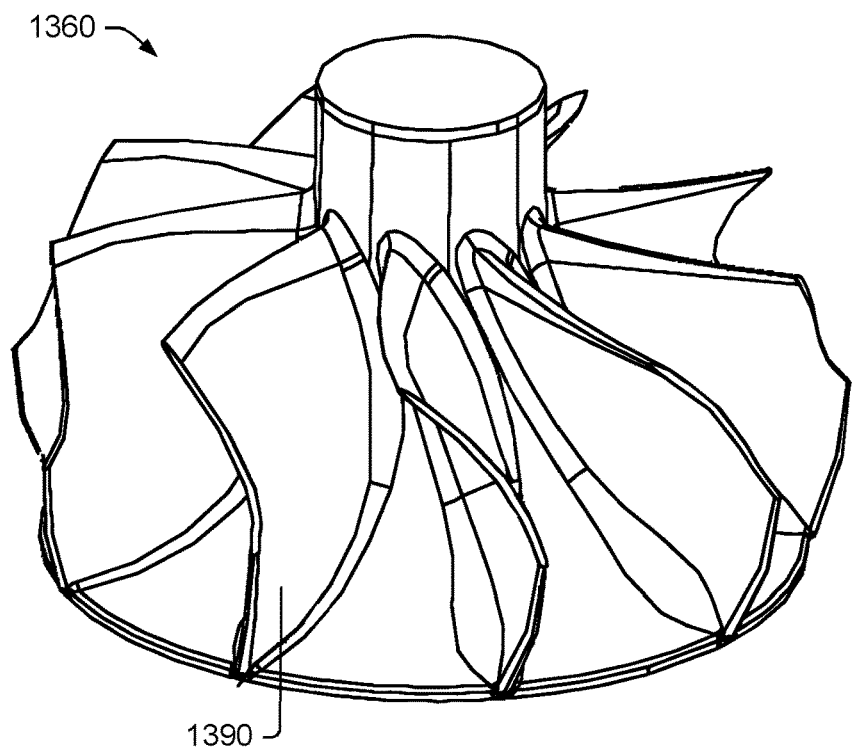
FIG. 13 is a series of perspective views of an example of a turbine wheel.
Figure 13:
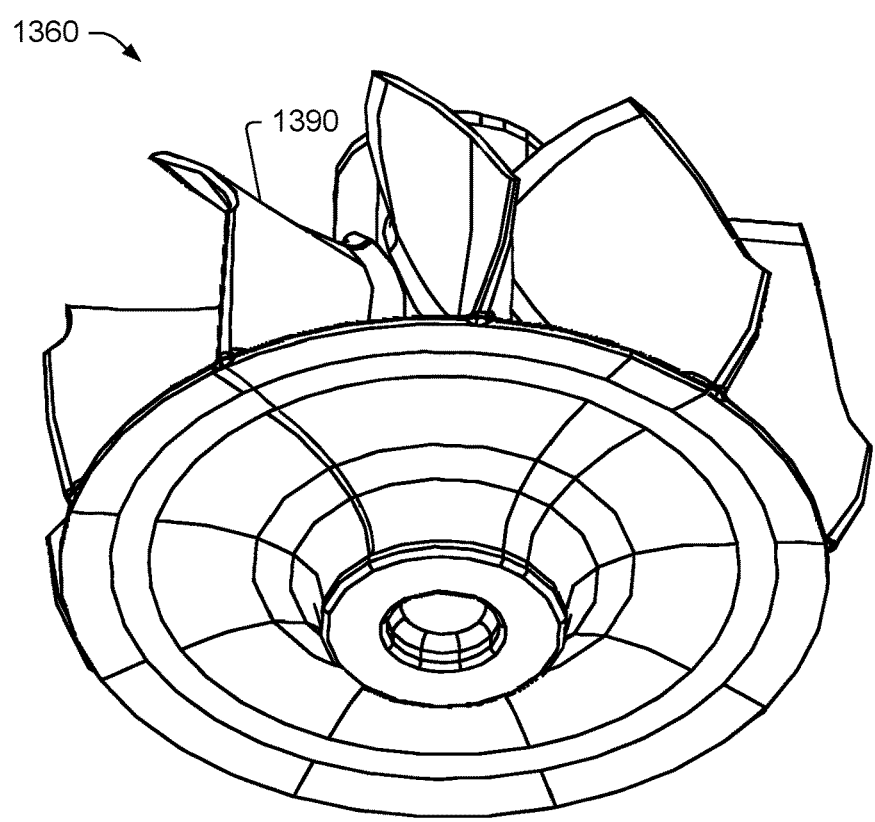

FIG. 13 shows two perspective views of an example of a turbine wheel 1360 where the example turbine wheel 1360 includes eleven blades where one of the blades is labeled as a blade 1390; noting that a turbine wheel may include a number of blades, for example, in a range from approximately 5 blades to approximately 30 blades. The example turbine wheel 1360 includes blades where the leading edge of each blade extends at least in part a distance beyond the backdisk. The example turbine wheel 1360 may be a mixed-flow turbine wheel, for example, where a leading edge of a blade can be defined in part by a cone angle. A leading edge of a blade of a mixed-flow turbine wheel may be straight, curved, straight and curved, etc., and may define a line that is not parallel to a rotational axis of the mixed-flow turbine wheel (e.g., at an angle to the rotational axis). As an example, a turbine wheel may be a radial flow turbine wheel or a mixed-flow turbine wheel where a mixed-flow turbine wheel includes radial and axial flow at a leading edge of a blade. As an example, a radial flow turbine wheel and/or a mixed-flow turbine wheel may be non-radially stacked, for example, due at least in part to lean.

Figure 14:
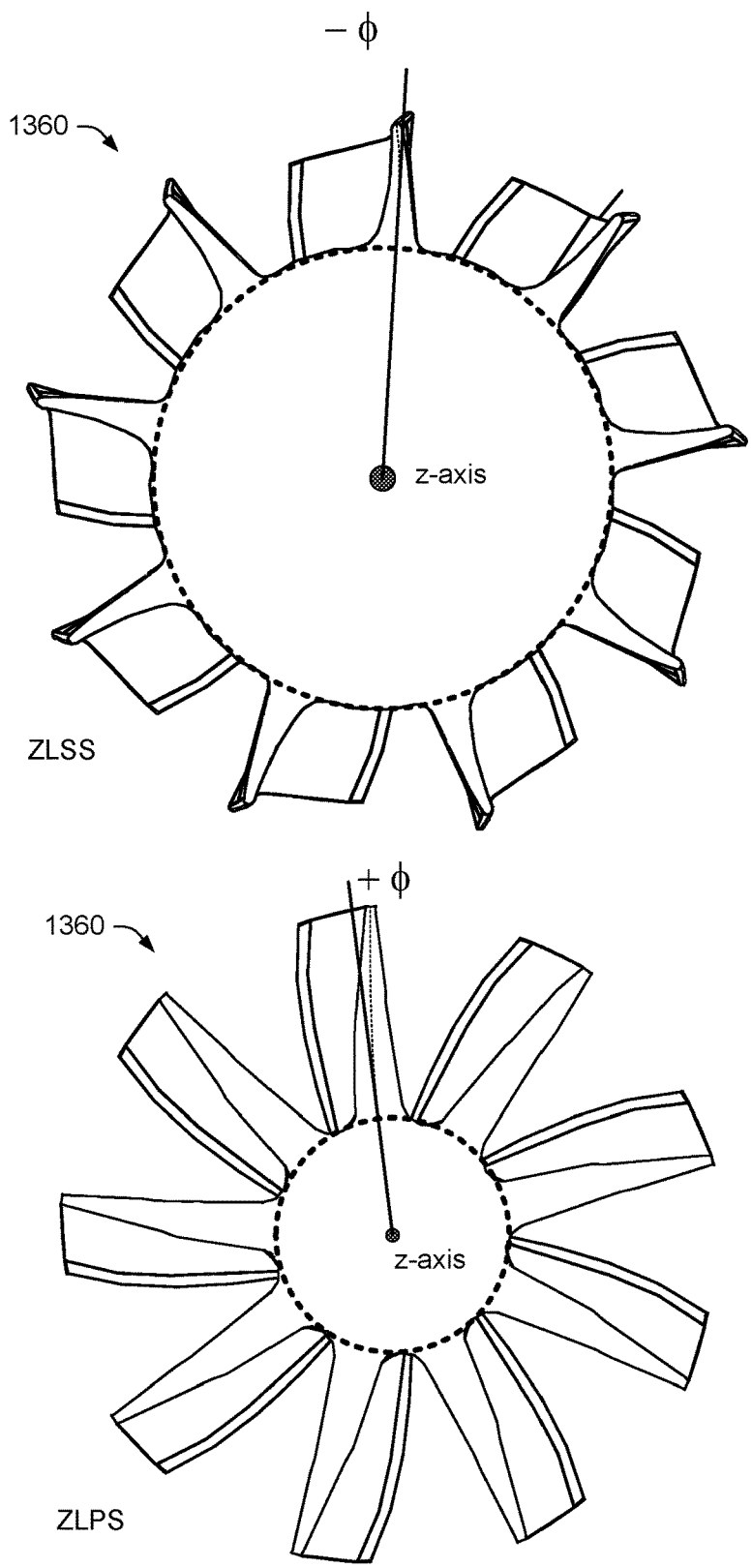
FIG. 14 is a series of plan, cutaway views of the turbine wheel of FIG. 13.

FIG. 14 shows two cross-sectional, cutaway views of the turbine wheel 1360 looking from the backdisk side where, closer to the backdisk at a z-axis position of ZLSS, the blades have a negative lean angle and where, closer to the nose at a z-axis position of ZLPS, the blades have a positive lean angle. In such a turbine wheel, the blades transition from a negative lean to a positive lean in moving axially from the backdisk to the nose of the turbine wheel where the transition occurs in an axial range defined by the shroud profile (e.g., shroud edge, S.E.), which is delimited by the leading edge at a lower axial position (e.g., minimum axial position of the shroud profile) and the trailing edge at a higher axial position (e.g., maximum axial position of the shroud profile). In the example of FIG. 14, at the axial position ZLSS, the lean angle may be in a range of approximately less than 0 degrees to approximately minus 10 degrees and, at the axial position ZLPS, the lean angle may be in a range of approximately greater than 0 degrees to approximately plus 10 degrees. In such examples, the lean angle may be measured with respect to a point at a hub of a blade (e.g., a hub profile) and a point at a shroud edge of the blade where the point at the hub of the blade is along a radial line where the point at the shroud edge of the blade does not fall on the radial line (e.g., such that the lean angle is non-zero). As to the values of the axial positions ZLSS and ZLPS, these may be determined with reference to the views of the turbine wheel 1360 such as the view of FIG. 11, for example, by matching the shapes and/or dimensions (e.g., radii, etc.) of the blades. As illustrated in FIGS. 12 and 14, a turbine wheel can include blades that include negative lean angles and positive lean angles where a transition occurs between negative lean angles and positive lean angles with respect to an axial dimension defines along a rotational axis of the turbine wheel.

As an example, a lean angle gradient may be in a range from approximately minus 50 degrees to approximately plus 50 degrees, in a range from approximately plus 50 degrees to approximately minus 50 degrees, in a range from approximately minus 40 degrees to approximately plus 40 degrees, in a range from approximately plus 40 degrees to approximately minus 40 degrees, in a range from approximately minus 30 degrees to approximately plus 30 degrees, in a range from approximately plus 30 degrees to approximately minus 30 degrees, in a range from approximately minus 20 degrees to approximately plus 20 degrees, in a range from approximately plus 20 degrees to approximately minus 20 degrees, in a range from approximately minus 10 degrees to approximately plus 10 degrees, in a range from approximately plus 10 degrees to approximately minus 10 degrees, in a range from approximately minus 5 degrees to approximately plus 5 degrees, in a range from approximately plus 5 degrees to approximately minus 5 degrees, etc. As an example, a lean angle gradient may be symmetric or asymmetric with respect to negative and positive values. For example, consider a lean angle gradient that has a lesser absolute lean angle value for a maximum negative lean angle value (e.g., most negative) than for a maximum positive lean angle value or that has a lesser absolute lean angle value for a maximum positive lean angle than for a maximum negative lean angle value (e.g., most negative). As an example, a lean angle gradient may be defined using lean angles measured with respect to a point at a hub of a blade (e.g., a hub profile) and a point at a shroud edge of the blade where the point at the hub of the blade is along a radial line where the point at the shroud edge of the blade does not fall on the radial line where the lean angle is non-zero and where the point at the shroud edge of the blade falls on the radial line where the lean angle is zero, which, for example, may mark an inflection point (e.g., or inflection region, etc.).

As mentioned, a turbine wheel, a shaft and wheel assembly (SWA), a turbine wheel blade, etc., may be described with respect to features shown in one or more of FIGS. 1 to 14. For example, a turbine wheel can include blades where the turbine wheel can include one or more features described in FIGS. 4 to 14. The example turbine wheels 760 and 1360 of FIGS. 7 and 13 include blades that extend outwardly from a hub, where each of the blades includes a shroud edge (e.g., S.E.), a leading edge (e.g., L.E.), a trailing edge (e.g., T.E.), a pressure side (e.g., P.S.), and a suction side (e.g., S.S.), where the shroud edge includes a minimum axial coordinate position where the shroud edge meets the leading edge, and a maximum axial coordinate position where the shroud edge meets the trailing edge, and where, between the minimum axial coordinate position and the maximum axial coordinate position, each of the blades includes a first lean angle at a first axial coordinate position defined with respect to a first radial line, a second lean angle at a second axial coordinate position defined with respect to a second radial line, and a lean angle inflection region at an inflection axial coordinate position that is between the first axial coordinate position and the second axial coordinate position.

Figure 15:
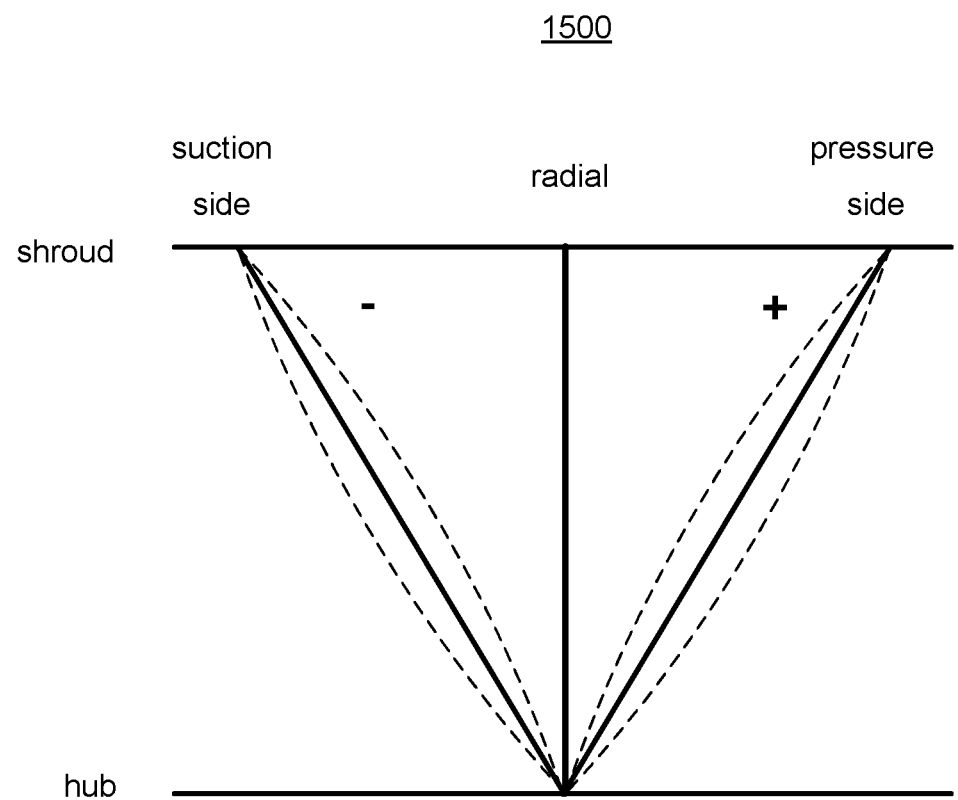
FIG. 15 is an example of a plot that defines a lean angle as being positive or negative with respect to a radial line.

FIG. 15 shows an example of a plot 1500 that can be utilized to define a lean angle where a lean angle toward a suction side is negative and a lean angle toward a pressure side is positive, with reference to a radial line, which defines a lean angle of zero (no lean). The plot 1500 includes dashed lines, which indicate that a lean of a suction side and/or a pressure side of a blade can differ from linear with respect to a radial dimension between a hub side and a shroud side of a blade. As an example, a lean may be linear over one or more portions and/or curved over one or more portions. As an example, a blade may be defined at least in part by a line between a hub side and a shroud side such that a line can be drawn from a point of a blade on a hub side and a point of a blade on a shroud side where, for stacking other than radial stacking, the line does not coincide with a radial line that passes through an axis of rotation of a turbine wheel, the point of the blade on the hub side, and the point of the blade on the shroud side. As an example, a pressure surface (e.g., pressure side) and/or a suction surface (e.g., suction side) of a blade may be linear along at least a portion of such a line and/or may be curved such that at least a portion of the blade does not fall on such a line.

As an example, a plot such as the plot 1500 of FIG. 15 may be utilized to characterize one or more regions of a blade of a turbine wheel. For example, consider, between a minimum axial coordinate position and a maximum axial coordinate position of a blade, the blades includes a first lean angle at a first axial coordinate position defined with respect to a first radial line, a second lean angle at a second axial coordinate position defined with respect to a second radial line, and a lean angle inflection region at an inflection axial coordinate position that is between the first axial coordinate position and the second axial coordinate position. In such an example, each of the first radial line and the second radial line may be represented as a vertical radial line as in the plot 1500 of FIG. 15, which may be a radial line at a particular corresponding axial coordinate position (see also, e.g., FIG. 12 and FIG. 14). As to the example of the first lean angle and the second lean angle, one may be positive (e.g., toward a pressure side of the blade) and the other may be negative (e.g., toward a suction side of the blade). In such an example, the lean angles can provide for enhanced performance. For example, consider enhanced efficiency of an exhaust turbine of a turbocharger that includes a turbine wheel with such blades (e.g., individual blades with both positive lean and negative lean).

Figure 16:
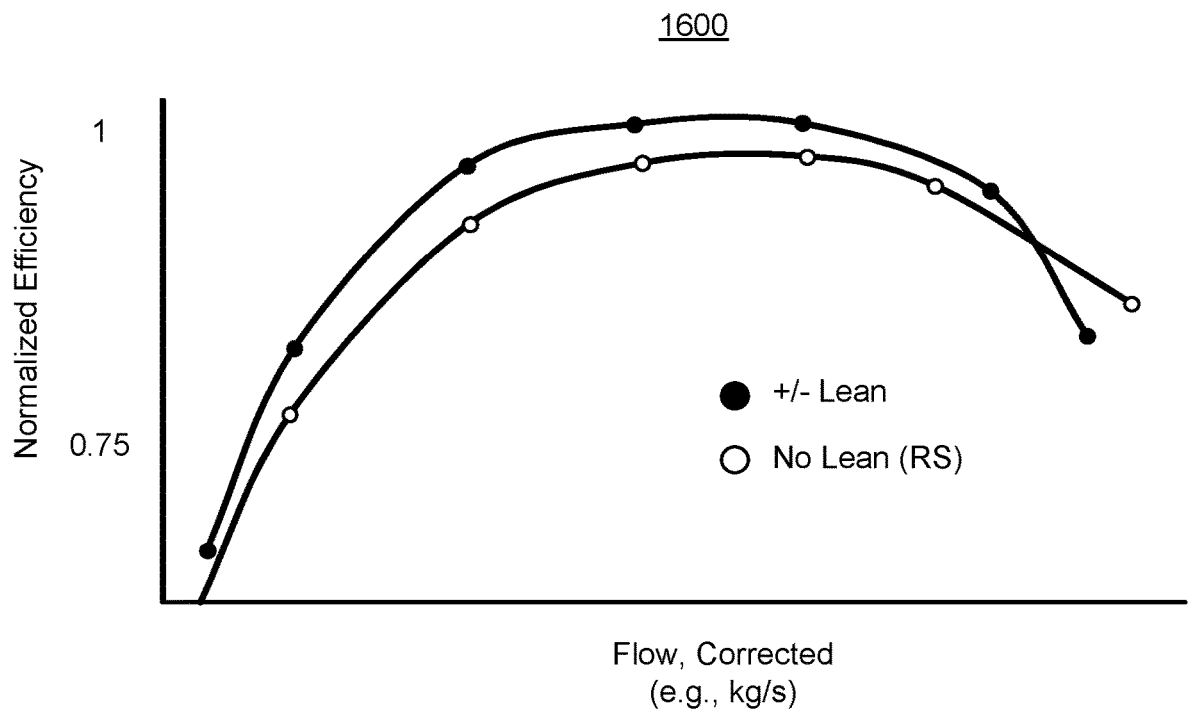
FIG. 16 is an example of a plot of normalized efficiency versus corrected flow rate for two different turbocharger turbine wheels.

FIG. 16 shows an example of a plot 1600 of efficiency versus corrected flow (e.g., kg/s) for two different turbine wheels where one has blades with no lean that are radially stacked and where the other has blades that have both positive lean and negative lean (e.g., positive lean angle and negative lean angle) where each of the blades includes a transition region for transition from positive lean to negative lean or negative lean to positive lean. In the example plot 1600, the turbine wheels are in assemblies that are variable geometry turbine assemblies (e.g., VGT or VNT). As shown in the plot 1600, maximum efficiency is increased by using blades with both positive lean and negative lean. Further, efficiency is increased over a broad range of corrected flow rates, particularly at lower corrected flow rates, which may help to reduce various types of turbo effects in vehicles that utilized turbocharged internal combustion engines. For example, for a turbocharger that includes a turbine wheel with blades where each of the blades includes both positive lean and negative lean, the turbocharger may experience less turbo lag (e.g., be more responsive to an increase in power demand) when compared to a turbine wheel with radially stacked blades with no lean.

As explained, turbine blades are traditionally radially stacked, meaning that at a given meridional location, the lean angle from hub to shroud is constant (representable by a straight radial filament), which is done to minimize stresses at the blade, and blade root fillet, as well as, to facilitate manufacturability. However, as demonstrated in the plot 1600, gains can be achieved in aerodynamic performance by using non-radially stacked blades.

Figure 17:
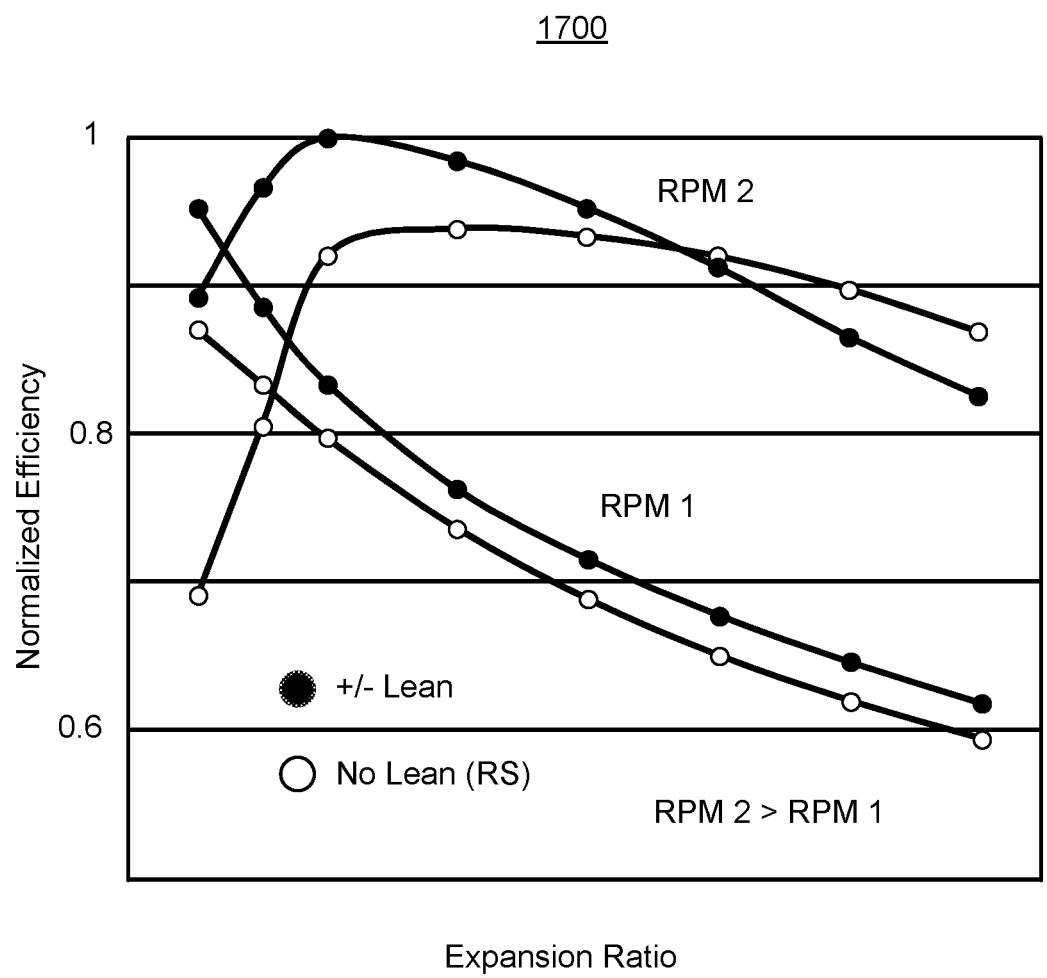
FIG. 17 is an example of a plot of normalized efficiency versus expansion ratio for two different turbocharger turbine wheels at two different rotational turbine wheel speeds.

FIG. 17 shows an example of a plot 1700 of normalized efficiency versus expansion ratio and rotational turbine wheel speed (RPM) for two different turbine wheels where one has blades with no lean that are radially stacked and where the other has blades that have both positive lean and negative lean (e.g., positive lean angle and negative lean angle) where each of the blades includes a transition region for transition from positive lean to negative lean or negative lean to positive lean. In the example plot 1700, the turbine wheels are in assemblies that do not include variable geometry turbine assemblies (e.g., VGT or VNT). As shown in the example plot 1700, normalized efficiency is increased for the positive/negative lean bladed turbine wheel at RPM 1 (e.g., 110,000 RPM) over the entire range of the expansion ratio (e.g., approximately 1 to approximately 5) and the normalized efficiency is increased for the positive/negative lean bladed turbine wheel at RPM 2 (e.g., 170,000 RPM) over most of the expansion ratio, particularly the lower half of the expansion ratios (e.g., approximately 1 to approximately 3.5).

Figure 18:
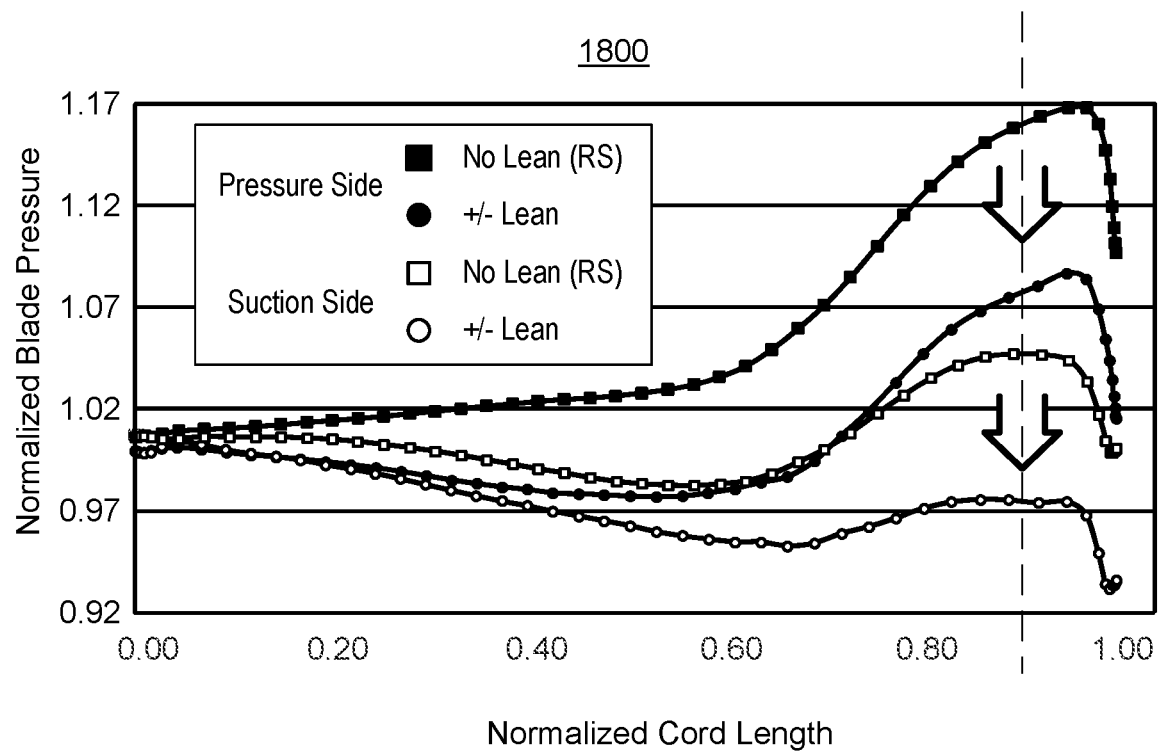
FIG. 18 is an example of a plot of normalized blade pressure versus corrected flow rate for two different turbocharger turbine wheels.

FIG. 18 shows an example of a plot 1800 for normalized blade pressure versus normalized cord length for two different turbine wheels where one has blades with no lean that are radially stacked and where the other has blades that have both positive lean and negative lean (e.g., positive lean angle and negative lean angle) where each of the blades includes a transition region for transition from positive lean to negative lean or negative lean to positive lean. As shown, the positive/negative lean bladed turbine wheel has a generally lower normalized blade pressure.

The example plot 1800 shows normalized blade tip pressure distribution with respect to normalized cord length in a manner that demonstrates a substantial effect of lean on reducing blade static pressure where there is a greater reduction on the pressure side (e.g., pressure surface) than on the suction side (e.g., suction surface), which results in a reduced difference in pressure between the pressure side and the suction side, which physically means that there are generally lower tip leakage flow/losses, and in faster acceleration of flow on the pressure side with a generally thinner bounder-layer than on the suction side, which physically means that there are lower secondary flow losses inside the blade passage (e.g., as defined by two adjacent blades).

In the example plot 1800, various normalized blade pressure values may be utilized to characterize a reduction in blade pressure. For example, at a normalized cord length value, values of normalized blade pressure or actual blade pressure may be compared. As shown, at a normalized cord length of approximately 0.90 (see, e.g., dashed vertical line), there is a reduction in pressure side normalized blade pressure of approximately 0.08 (e.g., 1.16-1.08) and there is a reduction in suction side normalized blade pressure of approximately 0.065 (e.g., 1.045-0.98). As another example, at a normalized cord length of approximately 0.05, there is a reduction in pressure side normalized blade pressure of approximately 0.04 (e.g., 1.03-0.98) and there is a reduction in suction side normalized blade pressure of approximately 0.03 (e.g., 0.99-0.96). The foregoing values and/or other values may be stated as percentages, absolute values, etc., to characterize how a blade with positive lean and negative lean can improve performance of an exhaust turbine of a turbocharger.

As an example, a turbine wheel can include a blade inducer region with a non-constant lean angle from hub to shroud. As an example, the lean in the blade inducer region can be positive (towards pressure side) or negative (towards suction side). As an example, progressively, along a meridional direction, a blade can have a reduced lean angle variation, which may go to zero (e.g., radially stacked), and then start, in absolute terms, increasing again, however, in the opposite direction, up to a blade exducer region. As an example, a blade can include an inflection point or inflection region that may be located at a meridional location between a leading edge and a trailing edge. As an example, the inflection point or inflection region may be within axial limits defined by a shroud edge of a blade.

As an example, a turbine wheel can include blades that reduce secondary losses and tip leakage losses within a blade passage which results in improved efficiency. For example, consider the data of the plot 1600, which show an increase in efficiency over a range of corrected flow rates, the data of the plot 1700, which show an increase in efficiency over ranges of expansion ratio, and the data of the plot 1800, which show reductions in normalized blade pressure.

As an example, a turbine wheel of a turbocharger can include blades that can be characterized by lean parameters (e.g., lean amount, evolution, and direction, as well as, the location of an inflection point or inflection region).

As an example, a turbocharger turbine wheel can include a hub; and blades that extend outwardly from the hub, where each of the blades includes a shroud edge, a leading edge, a trailing edge, a pressure side, and a suction side, where the shroud edge includes a minimum axial coordinate position where the shroud edge meets the leading edge, and a maximum axial coordinate position where the shroud edge meets the trailing edge, and where, between the minimum axial coordinate position and the maximum axial coordinate position, each of the blades includes a first lean angle at a first axial coordinate position defined with respect to a first radial line, a second lean angle at a second axial coordinate position defined with respect to a second radial line, and a lean angle inflection region at an inflection axial coordinate position that is between the first axial coordinate position and the second axial coordinate position.

As an example, a turbocharger turbine wheel can include a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes a shroud edge, a leading edge, a trailing edge, a pressure side, and a suction side, where the shroud edge includes a minimum axial coordinate position where the shroud edge meets the leading edge, and a maximum axial coordinate position where the shroud edge meets the trailing edge, and where, between the minimum axial coordinate position and the maximum axial coordinate position, each of the blades includes a first lean angle at a first axial coordinate position defined with respect to a first radial line, a second lean angle at a second axial coordinate position defined with respect to a second radial line, and a lean angle inflection region at an inflection axial coordinate position that is between the first axial coordinate position and the second axial coordinate position. In such an example, the first lean angle can be in an azimuthal direction toward the suction side and the second lean angle can be in an azimuthal direction toward the pressure side; or the first lean angle can be in an azimuthal direction toward the pressure side and the second lean angle can be in an azimuthal direction toward the suction side.

As an example, a lean angle can be an average lean angle. For example, a positive lean angle may be an average lean angle and a negative lean angle may be an average lean angle. As an example, such an average lean angle may be calculated using a plot such as the plot 1500 of FIG. 15, which shows hub and shroud dimensions and a blade region therebetween. As an example, an average lean angle may be determined by drawing a straight line between hub and shroud points of a blade as may be represented by hub and shroud dimensions as in the plot 1500 of FIG. 15.

As an example, a turbocharger turbine wheel can include a number of blades that may be selected from a range of 3 blades to 30 blades. For example, consider a turbocharger turbine wheel where the number of blades is eleven (11).

As an example, a turbocharger turbine wheel can include radial inlet flow blades (e.g., a radial flow turbine wheel) and/or can include mixed inlet flow blades (e.g., a mixed-flow turbine wheel). As to mixed inlet flow blades, each of the mixed inlet flow blades may be defined in part by a cone angle (e.g., at a leading edge).

As an example, a turbocharger turbine wheel can include a first lean angle and a second lean angle that are of opposite signs as can be defined by a radial line (see, e.g., the plot 1500 of FIG. 15).

As an example, a turbocharger turbine wheel can include a lean angle gradient between a first lean angle and a second lean angle where the first lean angle has a sign that is opposite that of the second lean angle. For example, the first lean angle can be a lean toward one side of a blade of the turbocharger turbine wheel and the second lean angle can be a lean toward an opposite side of the blade of the turbocharger turbine wheel. As an example, a lean angle gradient can pass through a zero lean angle. As an example, a lean angle gradient may be defined with respect to a rotational axis of a turbocharger turbine wheel. For example, in moving along the rotational axis from a backdisk to a nose, the lean angle gradient may change from a negative lean angle value to a positive lean angle value or, for example, from a positive lean angle value to a negative lean angle value. As mentioned, a turbocharger turbine wheel can include a non-constant lean angle for blades over an axial span in a direction along a rotational axis of the turbocharger turbine wheel. In such an example, the axial span may correspond to an axial distance from a minimum axial position of a shroud edge to a maximum axial position of a shroud edge or a portion of that axial distance.

As an example, a turbocharger can include a compressor assembly; a center housing assembly operatively coupled to the compressor assembly; and a turbine assembly operatively coupled to the center housing assembly, where the turbine assembly includes a turbine wheel that includes a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes a shroud edge, a leading edge, a trailing edge, a pressure side, and a suction side, where the shroud edge includes a minimum axial coordinate position where the shroud edge meets the leading edge, and a maximum axial coordinate position where the shroud edge meets the trailing edge, and where, between the minimum axial coordinate position and the maximum axial coordinate position, each of the blades includes a first lean angle at a first axial coordinate position defined with respect to a first radial line, a second lean angle at a second axial coordinate position defined with respect to a second radial line, and a lean angle inflection region at an inflection axial coordinate position that is between the first axial coordinate position and the second axial coordinate position. In such an example, the lean angles can provide for enhanced performance. For example, consider enhanced efficiency of an exhaust turbine of a turbocharger that includes a turbine wheel with such blades (e.g., individual blades with both positive lean and negative lean).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger turbine wheel comprising:
  a hub that comprises a rotational axis, a backdisk and a nose, wherein the rotational axis defines an axial coordinate (z) in a cylindrical coordinate system that comprises a radial coordinate (r) and an azimuthal coordinate (Θ) in a direction of intended rotation about the rotational axis; and
  blades that extend outwardly from the hub, wherein each of the blades comprises
    a shroud edge,
    a leading edge,
    a trailing edge,
    a pressure side, and
    a suction side,
    wherein the shroud edge comprises
      a minimum axial coordinate position where the shroud edge meets the leading edge, and
      a maximum axial coordinate position where the shroud edge meets the trailing edge, and
    wherein, between the minimum axial coordinate position and the maximum axial coordinate position, each of the blades comprises
      a first lean angle at a first axial coordinate position defined with respect to a first radial line and a line between a hub radius of the first radial line and the shroud edge at the first axial coordinate position,
      a second lean angle at a second axial coordinate position defined with respect to a second radial line and a line between a hub radius of the second radial line and the shroud edge at the second axial coordinate position, and
      a lean angle inflection region at an inflection axial coordinate position that is between the first axial coordinate position and the second axial coordinate position,
    wherein the first lean angle and the second lean angle are in opposite azimuthal directions, wherein the opposite azimuthal directions comprise an azimuthal direction toward the suction side and an azimuthal direction toward the pressure side.

2. The turbocharger turbine wheel of claim 1 wherein the first lean angle is in the azimuthal direction toward the suction side and wherein the second lean angle is in the azimuthal direction toward the pressure side.

3. The turbocharger turbine wheel of claim 1 wherein the first lean angle is in the azimuthal direction toward the pressure side and wherein the second lean angle is in the azimuthal direction toward the suction side.

4. The turbocharger turbine wheel of claim 1 wherein the first lean angle is an average lean angle defined along the line between the hub radius of the first radial line and the shroud edge at the first axial coordinate position.

5. The turbocharger turbine wheel of claim 1 wherein the second lean angle is an average lean angle define along the line between the hub radius of the second radial line and the shroud edge at the second axial coordinate position.

6. The turbocharger turbine wheel of claim 1 wherein a number of the blades is selected from a range of 3 blades to 30 blades.

7. The turbocharger turbine wheel of claim 6 wherein the number of the blades is eleven.

8. The turbocharger turbine wheel of claim 1 wherein the blades comprise radial inlet flow blades.

9. The turbocharger turbine wheel of claim 1 wherein the blades comprise mixed inlet flow blades.

10. The turbocharger turbine wheel of claim 9 wherein each of the mixed inlet flow blades comprises a cone angle.

11. The turbocharger turbine wheel of claim 1 wherein the first lean angle and the second lean angle comprise opposite signs.

12. The turbocharger turbine wheel of claim 1 comprising a lean angle gradient between the first lean angle and the second lean angle.

13. The turbocharger turbine wheel of claim 12 wherein the lean angle gradient passes through a zero lean angle.

14. The turbocharger turbine wheel of claim 12 wherein the lean angle gradient is defined with respect to the rotational axis.

15. A turbocharger comprising:
  a compressor assembly;
  a center housing assembly operatively coupled to the compressor assembly; and
  a turbine assembly operatively coupled to the center housing assembly, wherein the turbine assembly comprises a turbine wheel that comprises
    a hub that comprises a rotational axis, a backdisk and a nose, wherein the rotational axis defines an axial coordinate (z) in a cylindrical coordinate system that comprises a radial coordinate (r) and an azimuthal coordinate (Θ) in a direction of intended rotation about the rotational axis; and
    blades that extend outwardly from the hub, wherein each of the blades comprises
      a shroud edge,
      a leading edge,
      a trailing edge,
      a pressure side, and
      a suction side, wherein the shroud edge comprises
- a minimum axial coordinate position where the shroud edge meets the leading edge, and
- a maximum axial coordinate position where the shroud edge meets the trailing edge, and wherein, between the minimum axial coordinate position and the maximum axial coordinate position, each of the blades comprises
- a first lean angle at a first axial coordinate position defined with respect to a first radial line and a line between a hub radius of the first radial line and the shroud edge at the first axial coordinate position,
- a second lean angle at a second axial coordinate position defined with respect to a second radial line and a line between a hub radius of the second radial line and the shroud edge at the second axial coordinate position, and
- a lean angle inflection region at an inflection axial coordinate position that is between the first axial coordinate position and the second axial coordinate position, wherein the first lean angle and the second lean angle are in opposite azimuthal directions, wherein the opposite azimuthal directions comprise an azimuthal direction toward the suction side and an azimuthal direction toward the pressure side.

\* \* \* \* \*